US00RE43555E

(19) United States
(12) Reissued Patent
Higginbotham

(10) Patent Number: US RE43,555 E
(45) **Date of Reissued Patent: *Jul. 31, 2012**

(54) SELF CLEANING GUTTER SHIELD

(76) Inventor: Edward A. Higginbotham, Ridgewood, NJ (US)

( * ) Notice: This patent is subject to a terminal disclaimer.

(21) Appl. No.: 13/287,732

(22) Filed: Nov. 2, 2011

Related U.S. Patent Documents

Reissue of:
(64) Patent No.: 6,598,352
Issued: Jul. 29, 2003
Appl. No.: 09/922,636
Filed: Aug. 7, 2001

U.S. Applications:
(63) Continuation of application No. 11/191,173, filed on Jul. 28, 2005, now Pat. No. Re. 42,896.

(51) Int. Cl.
*E04D 13/064* (2006.01)

(52) U.S. Cl. ..... 52/12; 52/98; 248/48.1; 210/474

(58) Field of Classification Search ..... 52/11–12, 52/13–15, 98; 248/48.1; 210/474, 542, 348, 210/247, 294–296, 263–266, 97, 150
See application file for complete search history.

(56) References Cited

U.S. PATENT DOCUMENTS 297,382 A 4/1884 J. Golding (Continued)

FOREIGN PATENT DOCUMENTS

GB 2351757 1/2001

(Continued)

OTHER PUBLICATIONS

Miami Aqua-Culture, Inc., Polyester & Nylon Screening, Jan. 26, 2000, pp. 10, 20, 30, 40.

(Continued)

*Primary Examiner* — Jeanette E. Chapman
(74) *Attorney, Agent, or Firm* — Venable LLP; Jeffri A. Kaminski; Ryan M. Flandro

(57) ABSTRACT

[An elongated strip of extruded plastics material includes a vertical rear plane adapted to seat on the rear portion of a gutter-hanging bracket. The rear vertical plane integrally connects to a second forward extending plane that joins, by means of an underlying u-shaped channel, a v-shaped perforated third plane that forces water to pool and drop through the perforations. The third plane joins, by means of an underlying u-shaped channel, a flange that projects outwardly for retaining the strip to a gutter. A filter configuration comprised of a debris repelling membrane, overlying a skeletal structure of ellipsoid rods spaced and resting on vertical planes, serves to break the forward flow of water and to channel water onto and through its integral perforated horizontal plane. The filter configuration is readily inserted into the u-shaped channels existing on the forward and rear edges of the v-shaped perforated third plane.] *A filter assembly is provided including a filter membrane and a skeletal structure. The filter membrane defines a first surface and a second surface. The skeletal structure is provided beneath the filter membrane and is bounded by longitudinally extending ends. The skeletal structure includes a perforated plane spaced from the first surface of the filter membrane, and a first leg disposed on the perforated plane intermediate the longitudinally extending ends and extending along a length of the skeletal structure above the perforated plane. The first leg extends toward and contacts the first surface of the filter membrane, whereby when the filter assembly is installed in the open top of a rain gutter, water flowing across the filter membrane in a direction normal to the length of the skeletal structure is redirected downward by the first leg through the perforated plane and into the rain gutter. A gutter shield is provided for mounting in an open top of a rain gutter, the gutter shield including an elongated body adapted to receive the filter assembly.*

22 Claims, 9 Drawing Sheets

Figure 2:
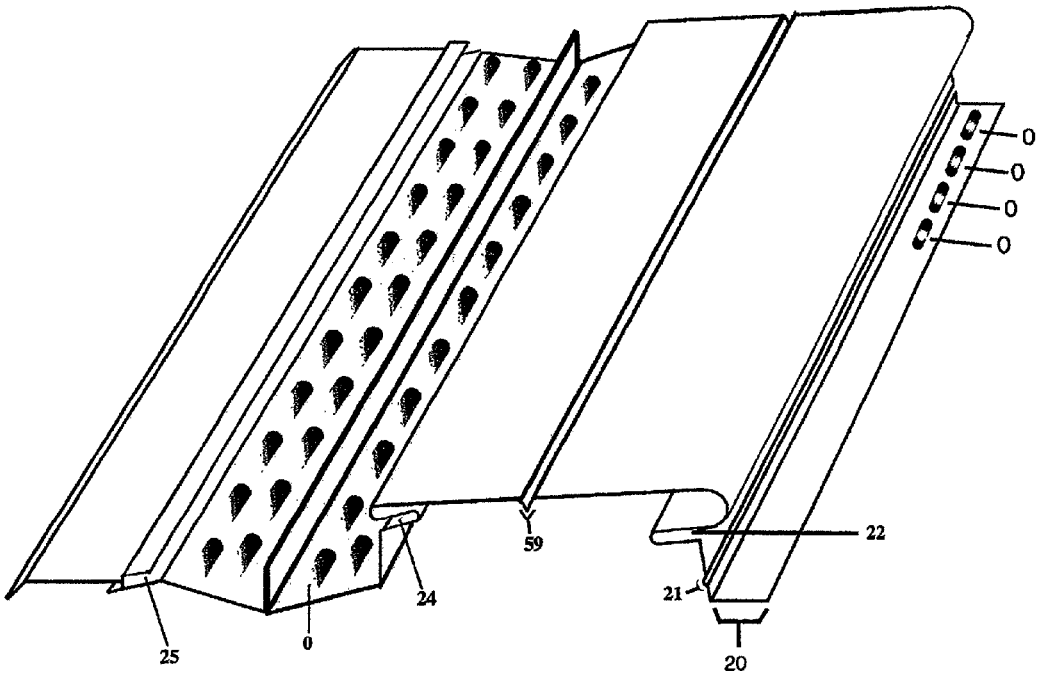

U.S. PATENT DOCUMENTS 546,042 A 9/1895 J. Van Horn
1,101,047 A 6/1914 A. Yates
1,562,191 A 11/1925 Reno
2,209,741 A 7/1940 Sullivan etal.
2,210,248 A 8/1940 D. Lighthill
2,271,081 A 1/1942 Layton
2,672,832 A 3/1954 Goetz
2,717,561 A 9/1955 Bearden
2,935,954 A 5/1960 Matthews et al.
3,057,481 A 10/1962 Ball
3,167,281 A 10/1962 Pall
3,426,909 A 2/1969 Garner
3,690,606 A 9/1972 Pall
3,741,398 A 6/1973 Abramson
3,855,132 A 12/1974 Dugan
4,050,104 A 9/1977 Baker
4,727,689 A 3/1988 Bosler
4,745,710 A 5/1988 Davis
4,757,649 A 7/1988 Vahldieck
4,820,407 A 4/1989 Lilie
4,841,686 A 6/1989 Rees
4,904,288 A 2/1990 D'Augereau
4,937,986 A 7/1990 Way, Sr. et al.
4,949,514 A 8/1990 Weller
4,959,932 A * 10/1990 Pfeifer ..... 52/12
5,010,696 A 4/1991 Knittel
5,040,750 A 8/1991 Brant
5,044,581 A 9/1991 Dressler
5,072,551 A 12/1991 Manoogian, Jr.
5,107,635 A 4/1992 Carpenter
5,181,350 A 1/1993 Meckstroth
5,257,482 A 11/1993 Sichel
5,271,192 A 12/1993 Nothum et al.
5,388,377 A 2/1995 Faulkner
5,406,754 A 4/1995 Cosby
5,459,965 A 10/1995 Meckstroth
5,491,998 A 2/1996 Hansen
5,495,694 A 3/1996 Kuhns
5,555,680 A 9/1996 Sweers
5,557,891 A 9/1996 Albracht
5,592,783 A 1/1997 Jones
5,595,027 A 1/1997 Vail
5,617,678 A 4/1997 Morandin et al.
5,619,825 A 4/1997 Leroney et al.
5,619,826 A 4/1997 Wu
5,640,809 A 6/1997 Ianelli
5,660,001 A 8/1997 Albracht
5,755,061 A 5/1998 Chen
5,813,173 A 9/1998 Way, Sr.
5,813,573 A 9/1998 Way
5,842,311 A 12/1998 Morin
5,956,904 A 9/1999 Gentry
6,016,631 A 1/2000 Lowrie
6,098,344 A 8/2000 Albracht
6,134,843 A 10/2000 Tregear
6,151,837 A 11/2000 Ealer, Sr.
6,161,338 A 12/2000 Kuhns
6,164,020 A 12/2000 Nitch
6,182,399 B1 2/2001 Pollera
6,205,715 B1 3/2001 Rex, Jr.
6,363,662 B1 4/2002 Coates
6,367,743 B1 4/2002 Iannelli
6,412,228 B1 7/2002 Meckstroth
6,463,700 B2 10/2002 Davis
6,598,352 B2 7/2003 Higginbotham
6,672,012 B2 1/2004 Bahroos
6,944,991 B2 9/2005 Kim
6,951,077 B1 10/2005 Higginbotham
7,174,688 B2 2/2007 Higginbotham
7,310,912 B2 * 12/2007 Lenney et al. ..... 52/12
7,344,636 B2 3/2008 Faram et al.
2001/0037610 A1 11/2001 Davis
2003/0046876 A1 3/2003 Higginbotham
2005/0257432 A1 11/2005 Higginbotham
2006/0101722 A1 5/2006 Ealer
2006/0179723 A1 8/2006 Robins
2007/0107323 A1 5/2007 Higginbotham
2007/0215539 A1 9/2007 Conroy

FOREIGN PATENT DOCUMENTS

GB 2351757 A * 1/2001
JP 1-304254 12/1989
JP 1-304254 A * 12/1989 ..... 52/12
JP 11-100953 4/1999
JP 2001-349022 12/2001
JP 2001-349022 A * 12/2001
JP 2002-061348 2/2002
JP 2002-61348 A * 2/2002
KR 2005079662 A * 8/2005
WO WO 95/02100 1/1995

OTHER PUBLICATIONS

Leafguard Publication.
K-guard Publication.

* cited by examiner

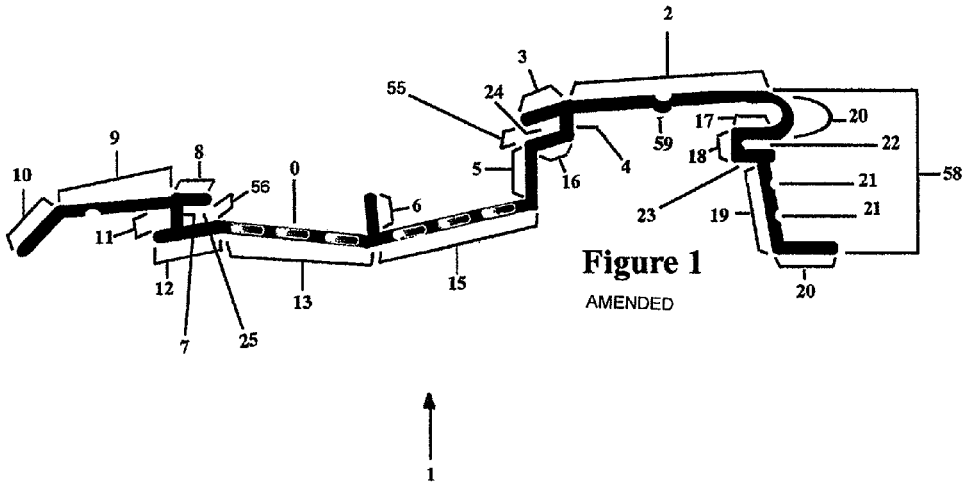
Figure 1
AMENDED

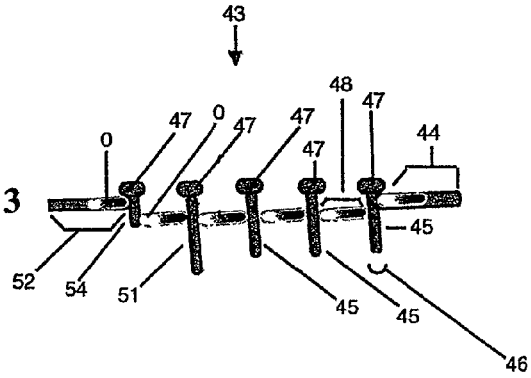
Figure 3
AMENDED
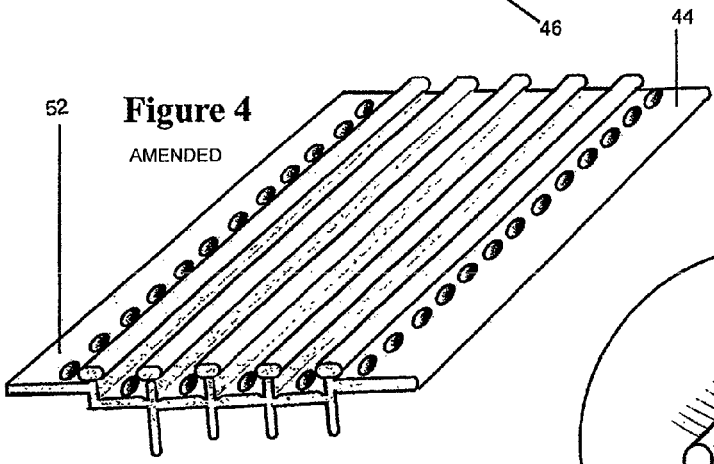
Figure 4
AMENDED
Figure 5
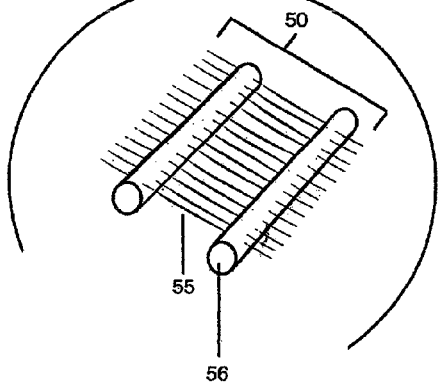
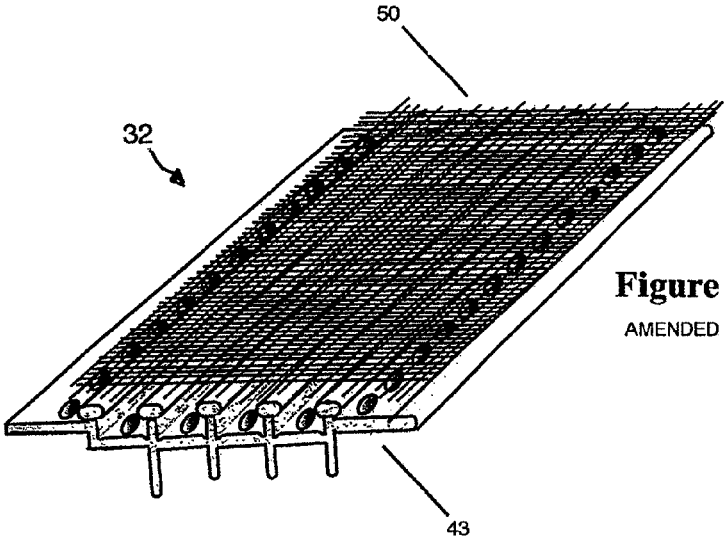
Figure 6
AMENDED

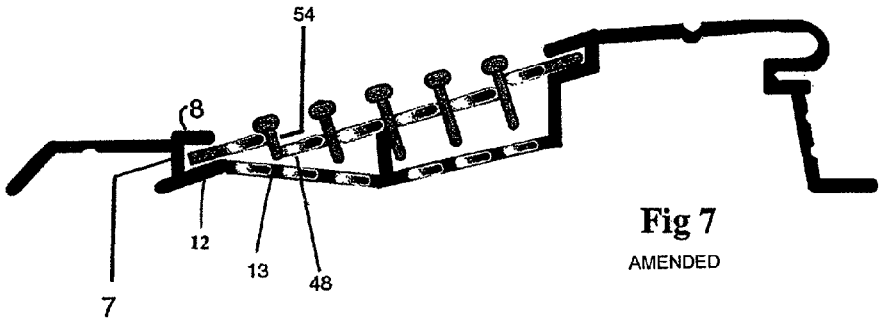
Fig 7
AMENDED
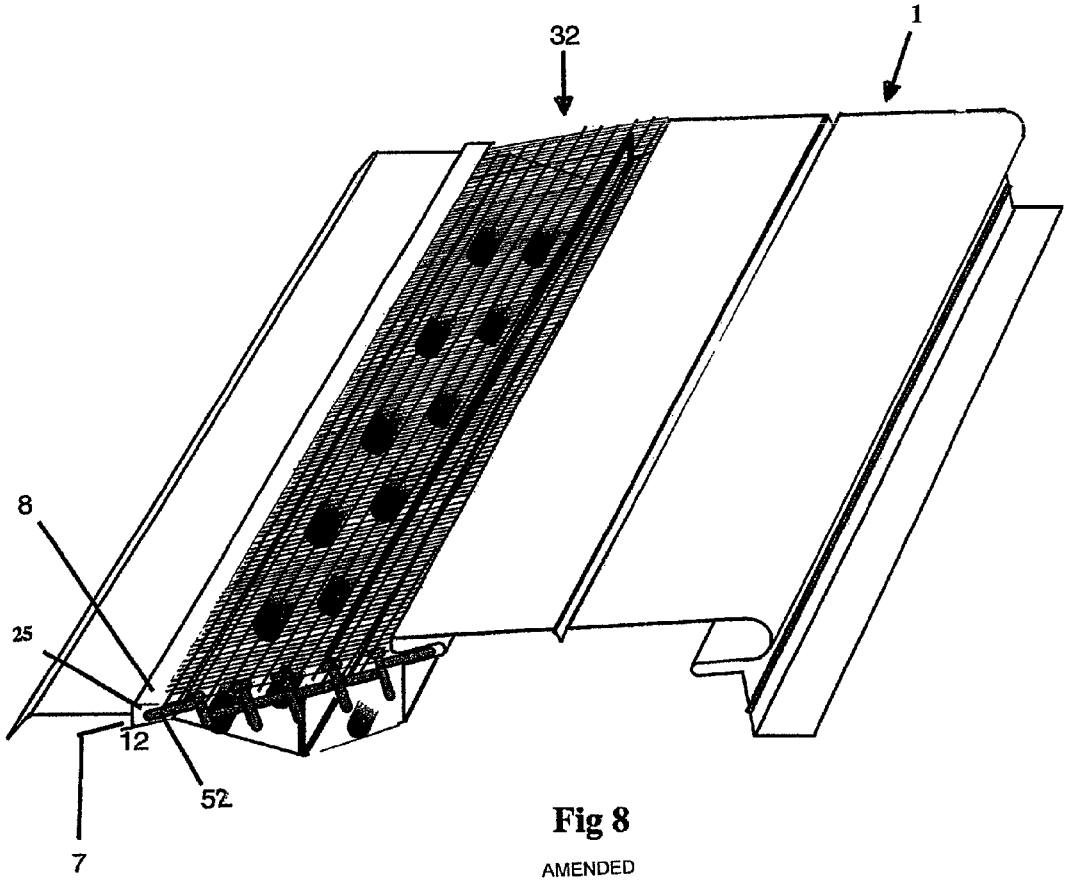
Fig 8
AMENDED

85%

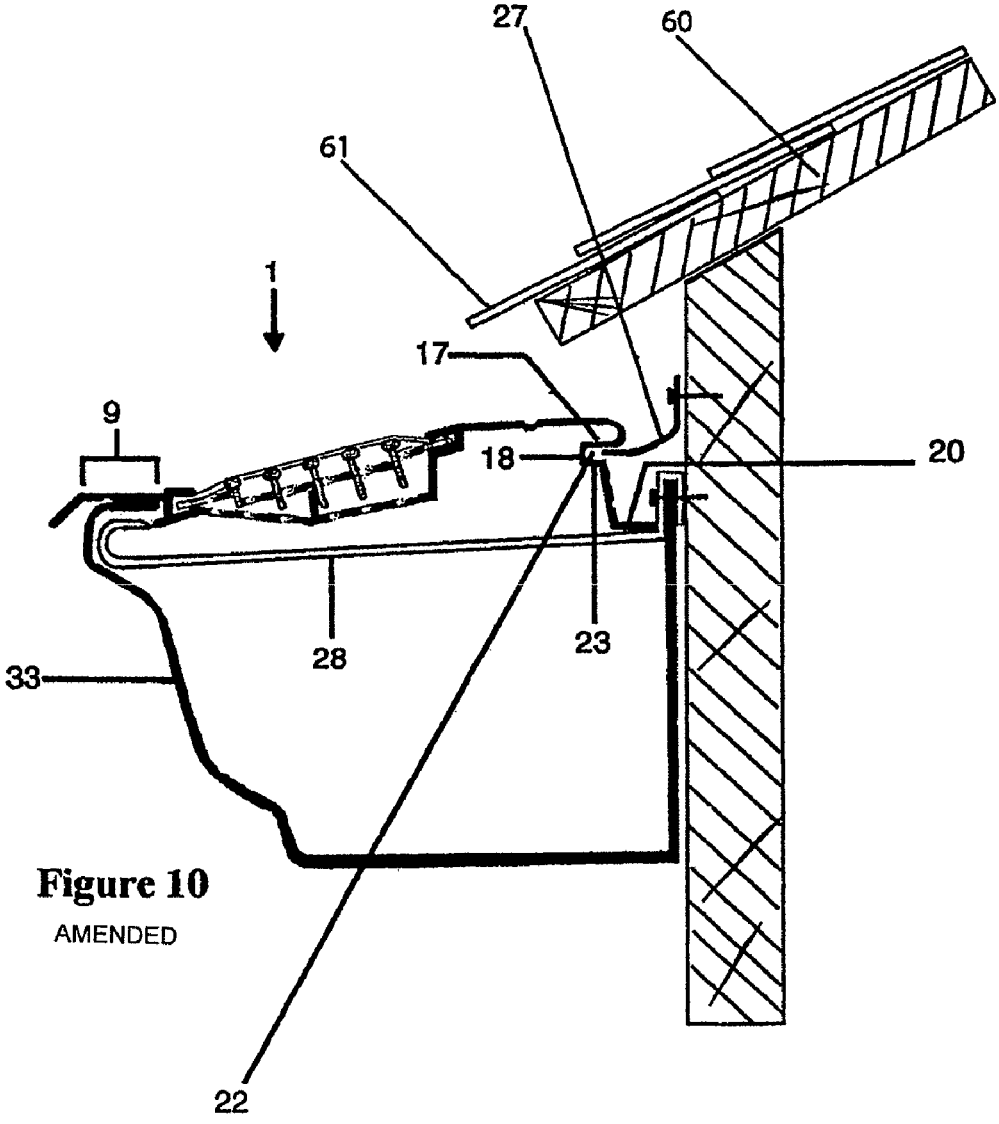
Figure 10
AMENDED

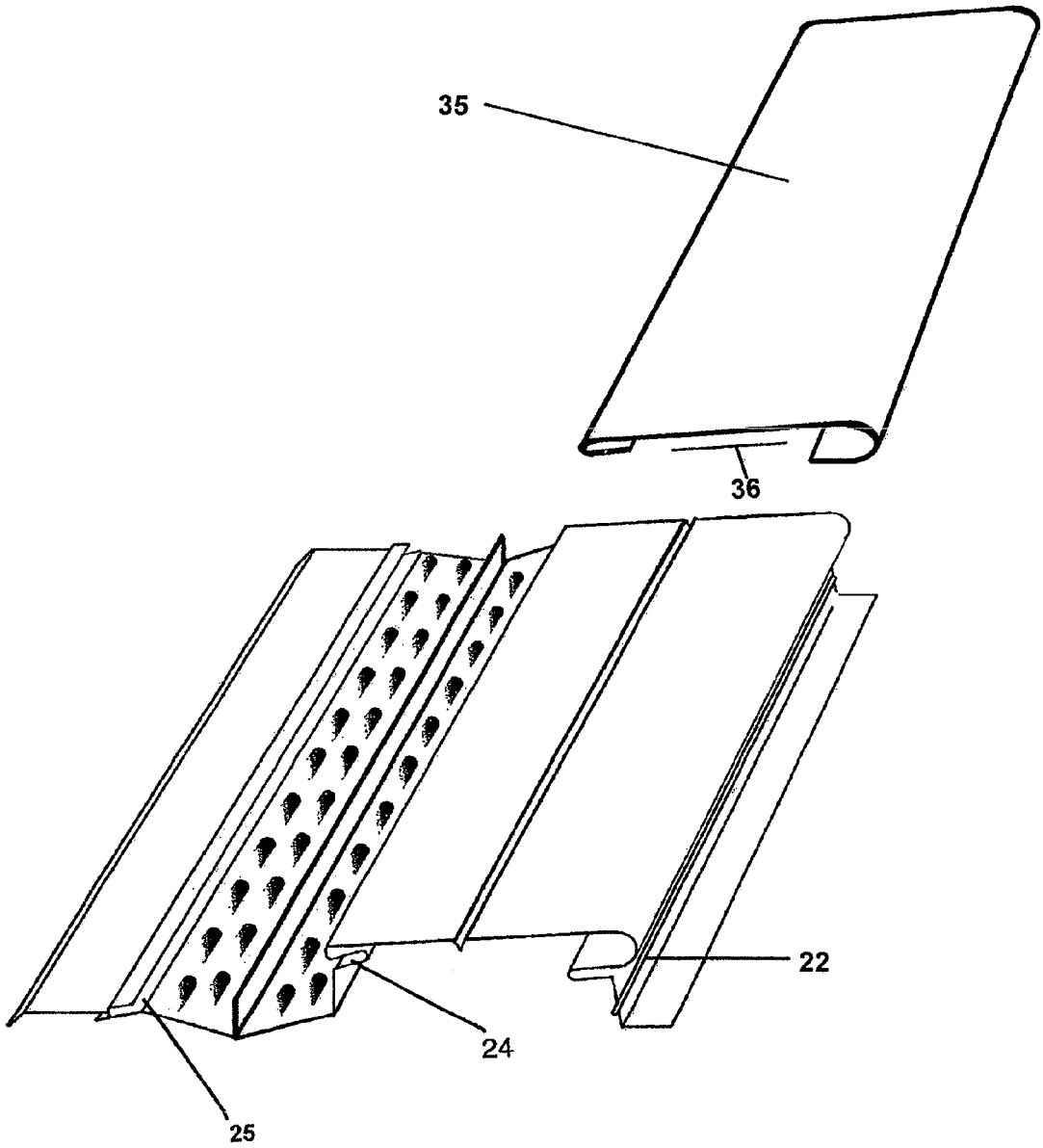
Figure 12
AMENDED

SELF CLEANING GUTTER SHIELD

Matter enclosed in heavy brackets [ ] appears in the original patent but forms no part of this reissue specification; matter printed in italics indicates the additions made by reissue.

*CROSS-REFERENCE TO RELATED APPLICATIONS*

*This reissue application is a continuation of U.S. Reissue application Ser. No. 11/191,173, now U.S. Pat. No. Re 42,896 (E1), which reissue application was filed on Jul. 28, 2005, seeking reissue of U.S. Pat. No. 6,598,352, which patent issued on Jul. 29, 2003 from U.S. application Ser. No. 09/922,636, filed on Aug. 7, 2001.*

*A request for a Certificate of Correction that references this application has been initiated in Reissue Pat. 42,896 pursuant to 37 CFR 1.177(a).*

BACKGROUND

1. Field of the Invention

Gutter covering systems are known to prevent debris from entering into the open top end of a rain gutter.

When debris accumulates within the body of a rain gutter in an amount great enough to cover the opening of a downspout-draining hole the draining of water from the rain gutter is impeded or completely stopped. This occurrence will cause the water to rise within the rain gutter and spill over it's uppermost front and rear portions. The purpose of a rain gutter: to divert water away from the structure and foundation of a home is thereby circumvented.

2. Prior Art

The invention relates to the field of Gutter Anti-clogging Devices and particularly relates to screens with affixed fine filter membranes, and to devices that employ recessed wells or channels in which filter material may be inserted, affixed to gutters to prevent debris from impeding the desired drainage of water.

Various gutter anti-clogging devices are known in the art and some are described in issued patents.

U.S. Pat. No. 5,557,891 to Albracht teaches a gutter protection system for preventing entrance of debris into a rain gutter. Albracht teaches a gutter protection system to include a single continuous two sided well with angled sides and perforated bottom shelf 9 into which rainwater will flow and empty into the rain gutter below. The well is of a depth, which is capable of receiving a filter mesh material. However, attempts to insert or cover such open channels of "reverse-curve" devices with filter meshes or cloths is known to prevent rainwater from entering the water receiving channels. This occurrence exists because of the tendency of such membranes, (unsupported by a proper skeletal structure), to channel water, by means of water adhesion along the interconnected paths existing in the filter membranes (and in the enclosures they may be contained by or in), past the intended water-receiving channel and to the ground. This occurrence also exists because of the tendency of filter mediums of any present known design or structure to quickly waterproof or clog when inserted into such channels creating even greater channeling of rainwater forward into a spill past an underlying rain gutter. Filtering of such open, recessed, channels existing in Albracht's invention as well as in U.S. Pat. No. 5,010,696, to Knittel, U.S. Pat. No. 2,672,832 to Goetz, U.S. Pat. Nos. 5,459,350, & 5,181,350 to Meckstroth, U.S. Pat. No. 5,491,998 to Hansen, U.S. Pat. No. 4,757,649 to Vahldieck and in similar "reverse-curved" inventions that rely on "reverse-curved" surfaces channeling water into an open channel have been known to disallow entrance of rainwater into the water-receiving channels. Albracht's as well as previous and succeeding similar inventions have therefore notably avoided the utilization of filter insertions. What may appear as a logical anticipation by such inventions at first glance, (inserting of a filter mesh or material into the channel), has been shown to be undesirable and ineffective across a broad spectrum of filtering materials: Employing insertable filters into such inventions has not been found to be a simple matter of anticipation, or design choice of filter medium by those skilled in the arts. Rather, it has proved to be an ineffective option, with any known filter medium, when attempted in the field. Such attempts, in the field, have demonstrated that the filter mediums will eventually require manual cleaning.

German Patent 5,905,961 teaches a gutter protection system for preventing the entrance of debris into a rain gutter. The German patent teaches a gutter protection system to include a single continuous two sided well 7 with angled sides and perforated bottom shelf which rainwater will flow and empty into the rain gutter below. The well is recessed beneath and between two solid lateral same plane shelves close to the front of the system for water passage near and nearly level with the front top lip of the gutter. The well is of a depth, which is capable of receiving a filter mesh material. However, for the reasons described in the preceding paragraphs, an ability to attach a medium to an invention, not specifically designed to utilize such a medium, may not result in an effective anticipation by an invention. Rather, the result may be a diminishing of the invention and its improvements as is the case in Albracht's U.S. Pat. No. 5,557,891, the German Patent, and similar inventions employing recessed wells or channels between adjoining planes or curvatures.

U.S. Pat. No. 5,595,027 to Vail teaches a continuous opening 24A between the two top shelves. Vail teaches a gutter protection system having a single continuous well 25, the well having a depth allowing insertion and retention of filter mesh material 26 (a top portion of the filler mesh material capable of being fully exposed at the holes). Vail does teach a gutter protection system designed to incorporate an insertable filter material into a recessed well. However, Vail notably names and intends the filter medium to be a tangled mesh fiberglass five times the thickness of the invention body. This type of filtration medium, also claimed in U.S. Pat. No. 4,841,686 to Rees, and in prior art currently marketed as FLOW-FREE. TM. is known to trap and hold debris within itself which, by design, most filter mediums are intended to do, i.e.: trap and hold debris. Vail's invention does initially prevent some debris from entering an underlying rain gutter but gradually becomes ineffective at channeling water into a rain gutter due to the propensity of their claimed filter mediums to clog with debris. Though Vail's invention embodies an insertable filter, such filter is not readily accessible for cleaning when such cleaning is necessitated. The gutter cover must be removed and uplifted for cleaning and, the filter medium is not easily and readily inserted replaced into its longitudinal containing channel extending three or more feet. It is often noted, in the field, that these and similar inventions hold fast pine needles in great numbers which presents an unsightly appearance as well as create debris dams behind the upwardly extended and trapped pine needles. Such filter meshes and non-woven lofty fiber mesh materials, even when composed of finer micro-porous materials, additionally tend to clog and fill with oak tassels and other smaller organic debris because they are not resting, by design, on a skeletal structure that encourages greater water flow through its overlying filter membrane than exists when such filter meshes or membranes contact planar continuously-connected surfaces. Known filter mediums of larger openings tend to trap and hold debris. Known filter mediums smaller openings clog or "heal over" with pollen and dirt that becomes embedded and remains in the finer micro-porous filter mediums. At present, there has not been found, as a matter of common knowledge or anticipation, an effective water-permeable, non-clogging "medium-of-choice" that can be chosen, in lieu of claimed or illustrated filter mediums in prior art, that is able to overcome the inherent tendencies of any known filter mediums to clog when applied to or inserted within the types of water receiving wells and channels noted in prior art.

Vail also discloses that filter mesh material 26 is recessed beneath a planar surface that utilizes perforations in the plane to direct water to the filter medium beneath. Such perforated planar surfaces as utilized by Vail, by Sweers U.S. Pat. No. 5,555,680, by Morin U.S. Pat. No. 5,842,311 and by similar prior art are known to only be partially effective at channeling water downward through the open apertures rather than forward across the body of the invention and to the ground. This occurs because of the principal of water adhesion: rainwater tends to flow around perforations as much as downward through them, and miss the rain gutter entirely. Also, in observing perforated planes such as utilized by Vail and similar inventions (where rainwater experiences its first contact with a perforated plane) it is apparent that they present much surface area impervious to downward water flow disallowing such inventions from receiving much of the rainwater contacting them.

A simple design choice or anticipation of multiplying the perforations can result in a weakened body subject to deformity when exposed to the weight of snow and/or debris or when, in the case of polymer bodies, exposed to summer temperatures and sunlight.

U.S. Pat. No. 4,841,686 to Rees teaches an improvement for rain gutters comprising a filter attachment, which is constructed to fit over the open end of a gutter. The filter attachment comprised an elongated screen to the underside of which is clamped a fibrous material such as fiberglass. Rees teaches in the Background of The Invention that many devices, such as slotted or perforated metal sheets, or screens of wire or other material, or plastic foam, have been used in prior art to cover the open tops of gutters to filter out foreign material. He states that success with such devices has been limited because small debris and pine needles still may enter through them into a rain gutter and clog its downspout opening and or lodge in and clog the devices themselves. Rees teaches that his use of a finer opening tangled fiberglass filter sandwiched between two lateral screens will eliminate such clogging of the device by smaller debris. However, in practice it is known that such devices as is disclosed by Rees are only partially effective at shedding debris while channeling rainwater into an underlying gutter. Shingle oil leaching off of certain roof coverings, pollen, dust, dirt, and other fine debris are known to "heal over" such devices clogging and/or effectively "water-proofing" them and necessitate the manual cleaning they seek to eliminate. (If not because of the larger debris, because of the fine debris and pollutants). Additionally, again as with other prior art that seeks to employ filter medium screening of debris; the filter medium utilized by Rees rests on an inter-connected planar surface which provides non-broken continuous paths over and under which water will flow, by means of water adhesion, to the front of a gutter and spill to the ground rather than drop downward into an underlying rain gutter. Whether filter medium is "sandwiched" between perforated planes or screens as in Rees' invention, or such filter medium exists below perforated planes or screens and is contained in a well or channel, water will tend to flow forward along continuous paths through cur as well as downward into an underlying rain gutter achieving less than desirable water-channeling into a rain gutter.

U.S. Pat. No. 5,956,904 to Gentry teaches a first fine screen having mesh openings affixed to an underlying screen of larger openings. Both screens are elastically deformable to permit a user to compress the invention for insertion into a rain gutter. Gentry, as Rees, recognizes the inability of prior art to prevent entrance of finer debris into a rain gutter, and Gentry, as Rees, relies on a much finer screen mesh than is employed by prior art to achieve prevention of finer debris entrance into a rain gutter. In both the Gentry and Rees prior art, and their improvements over less effective filter mediums of previous prior art, it becomes apparent that anticipation of improved filter medium or configurations is not viewed as a matter of simple anticipation of prior art which has, or could, employ filter medium. It becomes apparent that improved filtering methods may be viewed as patenable unique inventions in and of themselves and not necessarily an anticipation or matter of design choice of a better filter medium or method being applied to or substituted within prior art that does or could employ filter medium. However, though Rees and Gentry did achieve finer filtration over filter medium utilized in prior art, their inventions also exhibit a tendency to channel water past an underlying gutter and/or to heal over with finer dirt, pollen, and other pollutants and clog thereby requiring manual cleaning. Additionally, when filter medium is applied to or rested upon planar perforated or screen meshed surfaces, there is a notable tendency for the underlying perforated plane or screen to channel water past the gutter where it will then spill to the ground. It has also been noted that prior art listed herein exhibits a tendency to allow filter cloth mediums to sag into the opening of their underlying supporting structures. To compensate for forward channeling of water, prior art embodies open aperatures spaced too distantly, or allows the aperatures themselvs to encompass too large an area, thereby allowing the sagging of overlying filter membranes and cloths. Such sagging creates pockets wherein debris tends to settle and enmesh.

U.S. Pat. No. 3,855,132 to Dugan teaches a porous solid material which is installed in the gutter to form an upper barrier surface (against debris entrance into a rain gutter). Though Dugan anticipates that any debris gathered on the upper barrier surface will dry and blow away, that is not always the case with this or similar devices. In practice, such devices are known to "heal over" with pollen, oil, and other pollutants and effectively waterproof or clog the device rendering it ineffective in that they prevent both debris and water from entering a rain gutter. Pollen may actually cement debris to the top surface of such devices and fail to allow wash-off even after repeated rains. U.S. Pat. No. 4,949,514 to Weller sought to present more water receiving top surface of a similar solid porous device by undulating the top surface but, in fact, effectively created debris "traps" with the peak and valley undulation. As with other prior art, such devices may work effectively for a period of time but tend to eventually channel water past a rain gutter, due to eventual clogging of the device itself. There are several commercial filtering products designed to prevent foreign matter buildup in gutters. For example the FLOW-FREE .TM gutter protection system sold by DCI of Clifton Heights, Pa. Comprises a 0.75-inch thick nylon mesh material designed to fit within 5-inch K type gutters to seal the gutters and downspout systems from debris and snow buildup. The FLOW-FREE. TM device fits over the hanging brackets of the gutters and one side extends to the bottom of the gutter to prevent the collapse into the gutter. However, as in other filtering attempts, shingle material and pine needles can become trapped in the coarse nylon mesh and must be periodically cleaned.

U.S. Pat. No. 6,134,843 to Tregear teaches a gutter device that has an elongated matting having a plurality of open cones arranged in transverse and longitudinal rows, the base of the cones defining a lower first plane and the apexes of the cones defining an upper second plane. Although the Tregear device overcomes the eventual trapping of larger debris within a filtering mesh composed of fabric sufficiently smooth to prevent the trapping of debris he notes in prior art, the Tregear device tends to eventually allow pollen, oil which may leach from asphalt shingles, oak tassels, and finer seeds and debris to coat and heal over a top-most matting screen it employs to disallow larger debris from becoming entangled in the larger aperatured filtering medium it covers. Tregear indicates that filtered configurations such as a commercially available attic ventilation system known as Roll Vent.RTM. manufactured by Benjamin Obdyke, Inc. Warminster, Pa. Is suitable, with modifications that accomadate its fitting into a raingutter. However, such a device has been noted, even in its original intended application, to require cleaning (as do most attic screens and filters) to remove dust, dirt, and pollen that combine with moisture to form adhesive coatings that can scum or heal over such attic filters. Filtering mediums (exhibiting tightly woven, knitted, or tangled mesh threads to achieve density or "smoothness") employed by Tregear and other prior art have been unable to achieve imperviousness to waterproofing and clogging effects caused by a healing or pasting over of such surfaces by pollen, fine dirt, scum, oils, and air and water pollutants. Additionally, referring again to Tregear's device, a lower first plane tends to channel water toward the front lip of a rain gutter, rather than allowing it's free passage downward, and allow the feeding and spilling of water up and over the front lip of a rain gutter by means of water-adhesion channels created in the lower first plane.

Prior art has employed filter cloths over underlying mesh, screens, cones, longitudinal rods, however such prior art has eventually been realized as unable to prevent an eventual clogging of their finer filtering membranes by pollen, dirt, oak tassels, and finer debris. Such prior art has been noted to succumb to eventual clogging by the healing over of debris which adheres itself to surfaces when intermingled with organic oils, oily pollen, and shingle oil that act as an adhesive. The hoped for cleaning of leaves, pine needles, seed pods and other debris by water flow or wind, envisioned by Tregear and other prior art, is often not realized due to their adherence to surfaces by pollen, oils, pollutants, and silica dusts and water mists. The cleaning of adhesive oils, fine dirt, and particularly of the scum and paste formed by pollen and silica dust (common in many soil types) by flowing water or wind is almost never realized in prior art.

Prior art that has relied on reverse curved surfaces channeling water inside a rain gutter due to surface tension, of varied configurations and pluralities, arranged longitudinally, have been noted to lose their surface tension feature as pollen, oil, scum, Eventually adhere to them. Additionally, multi-channeled embodiments of longitudinal reverse curve prior art have been noted to allow their water receiving channels to become packed with pine needles, oak tassels, other debris, and eventually clog disallowing the free passage of water into a rain gutter. Examples of such prior art are seen in the commercial product GUTTER HELMET.RTM. manufactured by American metal products and sold by Mr. Fix It of Richmond, Va. In this and similar Commercial products, dirt and mildew build up on the bull-nose of the curve preventing water from entering the gutter. Also ENGLERT'S LEAF-GUARD. RTM. Manufactured and distributed by Englert Inc. of Perthamboy N.J. and K-GUARD. RTM. Manufactured and distributed by KNUDSON INC. of Colorado are similarly noted to lose their water-channeling properties due to dirt buildup. These commercial products state such, in literature to homeowners that advises them on the proper method of cleaning and maintaining their products.

None of theses above-described systems keep all debris out of a gutter system allowing water alone to enter, for an extended length of time. Some allow lodging and embedding of pine needles and other debris is able to occur within their open water receiving areas causing them to channel water past a rain gutter. Others allow such debris to enter and clog a rain gutter's downspout opening. Still others, particularly those employing filter membranes, succumb to a paste and or scum-like healing over and clogging of their filtration membranes over time rendering them unable to channel water into a rain gutter. Pollen and silica dirt, particularly, are noted to cement even larger debris to the filter, screen, mesh, perforated opening, and/or reverse curved surfaces of prior art, adhering debris to prior art in a manner that was not envisioned.

Accordingly, it is an object of the present invention to provide a gutter shield that permits drainage of water runoff into the gutter trench without debris becoming entrenched or embedded within the surface of the device itself and that employs a filtration membrane configuration that possesses sufficient self-cleaning properties that prevent the buildup of scum, oil, dirt, pollen, and pollutants that necessitate eventual manual cleaning as is almost always the case with prior art.

Another object of the present invention is to provide a gutter shield that employs a filtration membrane that is readily accessible and easily replaceable if such membrane is damaged by nature or accident. Another object of the present invention is to provide a gutter shield that better enhances the cosmetic appearance and blending of and with a building's rain gutter system than is offered by prior art.

Another object of the present invention is to provide a gutter shield that will accept more water run-off into a five inch K-style rain gutter than such a gutter's downspout opening is able to drain before allowing the rain gutter to overflow (in instances where a single three-inch by five-inch downspout is installed to service 600 square feet of roofing surface).

Other objects will appear hereinafter.

SUMMARY

It has now been discovered that the above and other objects of the present inventioin may be accomplished in the following manner. Specifically, the present invention provides a gutter shield for use with gutters having an elongated opening. Normally the gutters are attached to or suspended from a building.

The gutter shield device comprises an extruded polymer uni-body of an angled first plane that rests on the front lip of a rain gutter and that adjoins a second downwardly angled perforated plane by means of a u-shaped channel that exists on the underside of the rear edge of said first plane.

A second plane then joins to an upward vertical support leg that joins to a third perforated plane that angles downward (referenced to the rear wall of an underlying rain gutter) and inward toward the vertical leg.

Second and third perforated planes thereby exibit an extended v-shaped configuration that directs water to the inward center of a rain gutter where it is then dammed by a vertical support leg that forces the water to pool upward and drop through perforations rather than channel past them.

A fourth upwardly angled plane positioned above an behind the v-shaped configuration of planes two and three, joins to plane three by means of a u-shaped channel and vertical leg, joined to and beneath the forward edge of the u-shaped channel, that exists underside the forward (referenced to the front lip of a rain gutter) edge of plane four.

The fourth plane has embedded in the center of its upper surface, a recessed channel to facilitate scoring and braking of the fourth plane.

The fourth plane then joins to a rear vertical leg by means of a rear u-shaped channel.

A filtration configuration is inserted in the extruded body of the gutter sheild device.

The upper membrane of the filter configuration is comprised of smaller threads intersecting or adjoing larger ones at centermost points on the sides of the larger threads. The upper membrane thereby avoids presenting overlapping or underlapping thread joints that tend to trap and hold debris, while presenting a very water permeable surface that more readily lends itself to self-cleaning by way of flowing water.

The upper membrane is sewn to the edges of an underlying skeletal structure that exhibits a strong siphoning action.

The lower supporting skeletal structure beneath the upper membrane is comprised of ellipses spaced approximately 0.19 inch from end to end that have underlying vertical legs that join, at their lowest point, to a horizontal perforated surface that has underlying vertical extending legs. This combination of multiple elliptical surfaces so spaced, and of vertical planes above and beneath a perforated horizontal plane, exhibits strong tendencies to break forward water channeling, that often causes water to spill past a rain gutter, and redirect water downward and inward into an underlying rain gutter.

The gutter sheild body may be inserted into and secured in a rain gutter by common methods now recognized as public domain. The filtration configuration is pinched on each lateral edge and then the edges are realeased into u-shaped edge receiving channels. The filtration configuration is supported in its center by an upward extending vertical leg that adjoins perforated planes two and three at their lowest edges.

OBJECTS AND ADVANTAGES

An object of the present invention is to provide a gutter shield device that employs a fine filtration combination that is not subject to gumming or healing over by pollen, silica dust, oils, and other very fine debris.

Another object of the present invention is to provide a gutter shield body that can quickly and easily, in the field at the time of installation, be retrofitted with the current gutter coil employed in extruding the raingutters the present invention would be installed in. Another object of the present invention is to provide a filtration membrane that is not affixed to an underlying surface by adhesive means that tend to gum and trap debris in hot weather.

Another object of the present invention is to provide a filtration configuration that does not allow its filter cloth or membrane to sag and develop debris catching pockets. Another object of the present invention is to provide a gutter shield device that disallows the entrance of debris into a raingutter in the event its removable filter requires replacement due to storm damage.

Another object of the present invention is to provide a filtration configuration and encompassing body that eliminates any forward channeling of rain water. Another object of the present invention is to provide a filtration configuration that may more readily be inseted into or removed, if required, than has been realized in prior art.

[THE DRAWINGS] *BRIEF DESCRIPTION OF THE DRAWINGS*

FIG. 1. is a partial or fragmentary sectional edge view of the present invention displaying the profile of the main body of the gutter cover as it would appear extruding from a die.

FIG. 2. is a partial or fragmentary top perspective view of the main body of the present invention.

FIG. 3. is a partial or fragmentary sectional edge view of a component of the present invention displaying the profile of a supporting skeletal filtration structure that is an insertable component employed by the present invention.

FIG. 4. is a partial or fragmentary top perspective view of the supporting skeletal filtration component employed by the present invention.

FIG. 5. is an enlarged isolated view of a filter medium which affixes to the supporting filtration skeleton component employed by the present invention.

FIG. 6. is a partial or fragmentary top perspective view of the completed filtering component of the present invention as it appears prior to insertion into a receiving channel of the main body of the present invention.

FIG. 7. is a partial or fragmentary sectional edge view of the present invention displaying the profiles of it's main body with filtration skeleton inserted.

Figure 9:
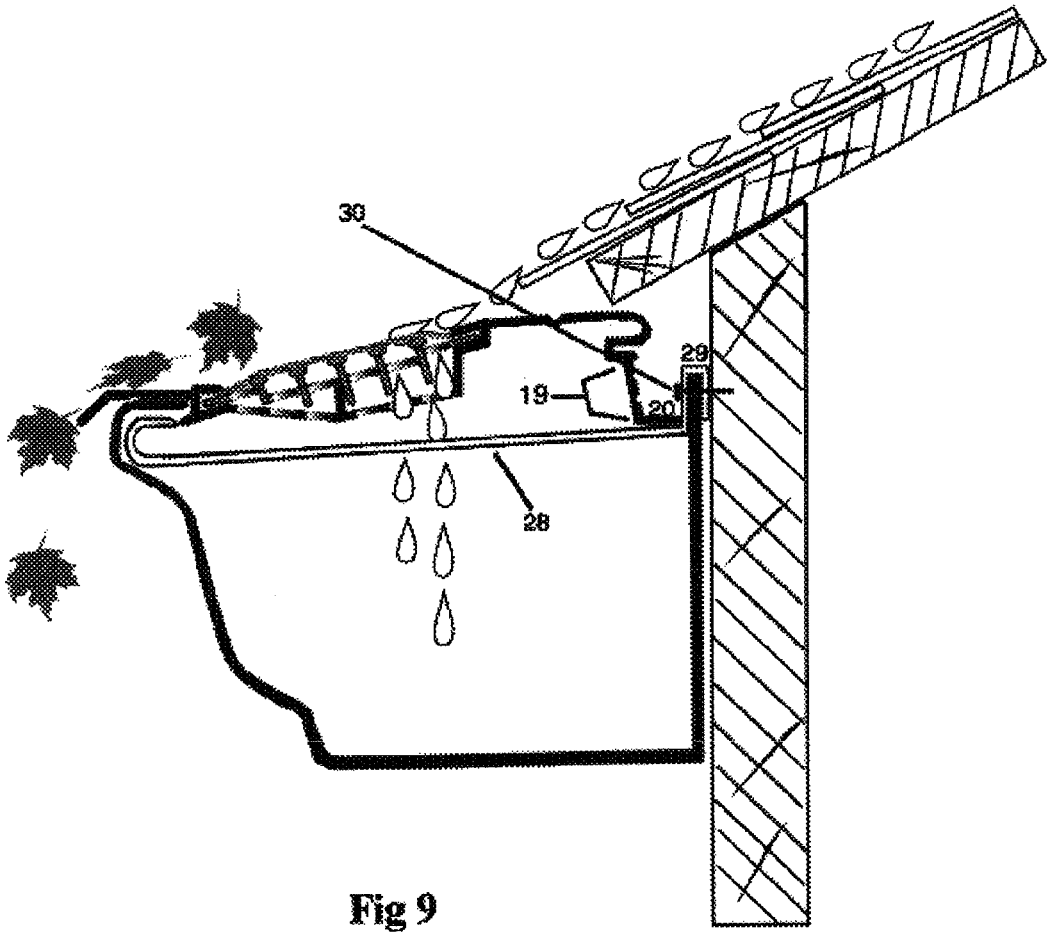

FIG. 8. is a partial or fragmentary top perspective view of the preferred embodiment of the present invention displaying the main body of the gutter cover with inserted filtration skeleton and affixed (to the skeleton) filter medium;

FIG. 9. is a partial or fragmentary sectional view displaying the profiles of a roofline portion of a building structure, and shows an end view of a sectioned K-style gutter and a side or end view of an overlying and attached gutter cover section.

Figure 9A:
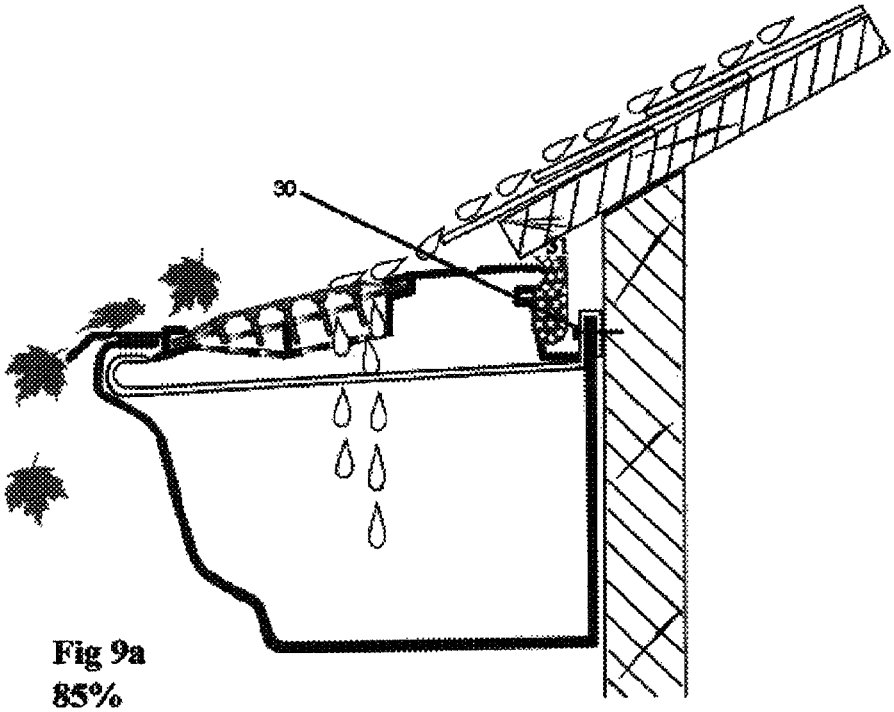

FIG. 9a. is a partial or fragmentary sectional view displaying the profiles of a roofline portion of a building structure, K-style gutter, attached gutter cover, and optional rear insertable filter medium.

FIG. 10. is a partial or fragmentary sectional view displaying the profiles of a roofline portion of a building structure, K-style gutter, attached gutter cover, and optional securing ledge.

Figure 11:
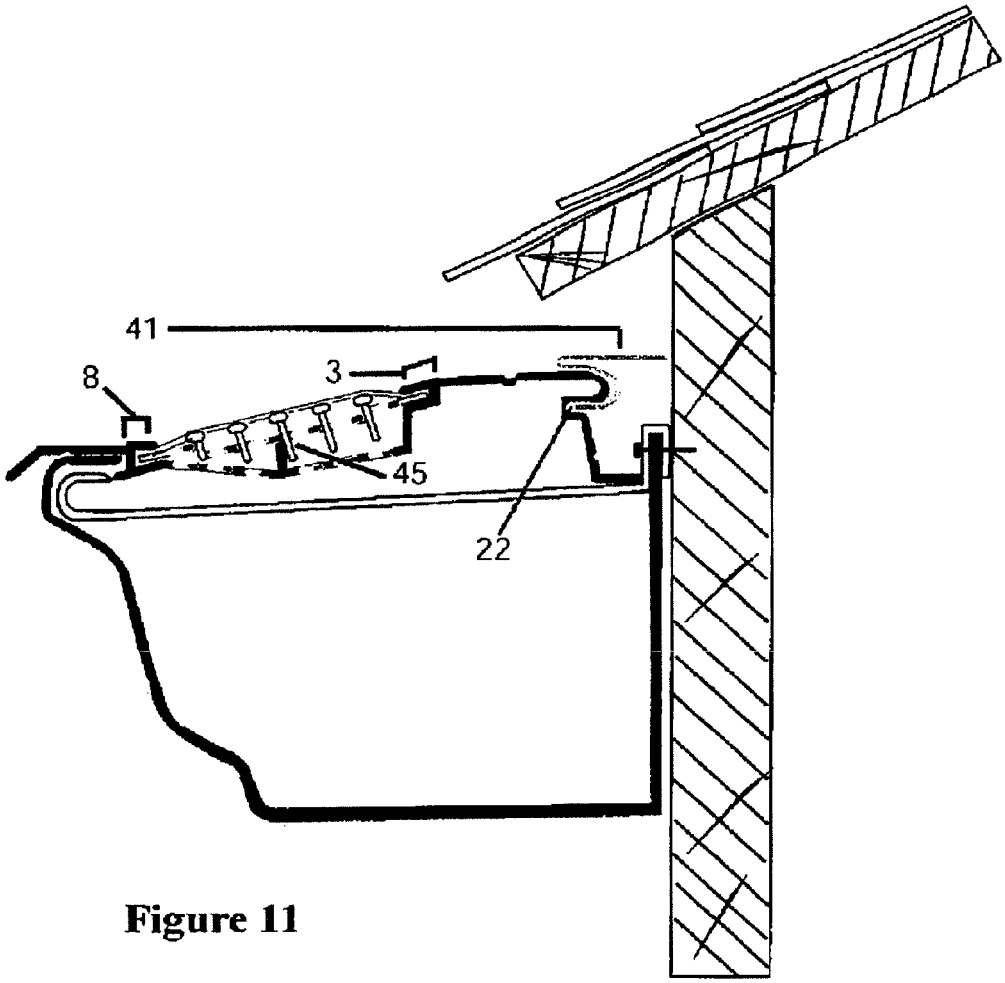

FIG. 11. is a partial or fragmentary sectional view displaying the profiles of a roofline portion of a building structure, K-style gutter, attached gutter cover, and optional rear extension component.

Figure 11A:
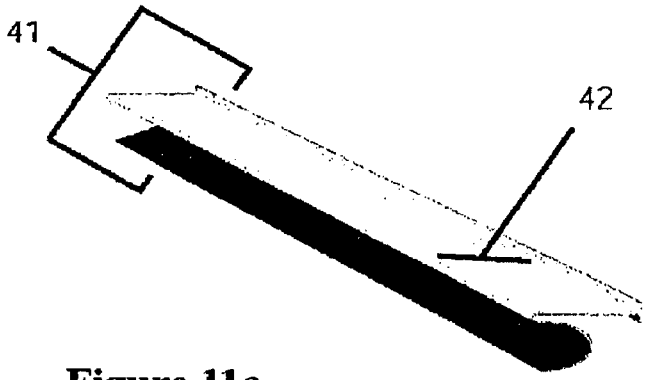

FIG. 11a. is a partial or fragmentary top perspective view of an optional rear extension component of the present invention.

FIG. 12. is a partial or fragmentary top perspective view of the main body of the present invention and of an optional covering sleeve component.

Figure 12A:
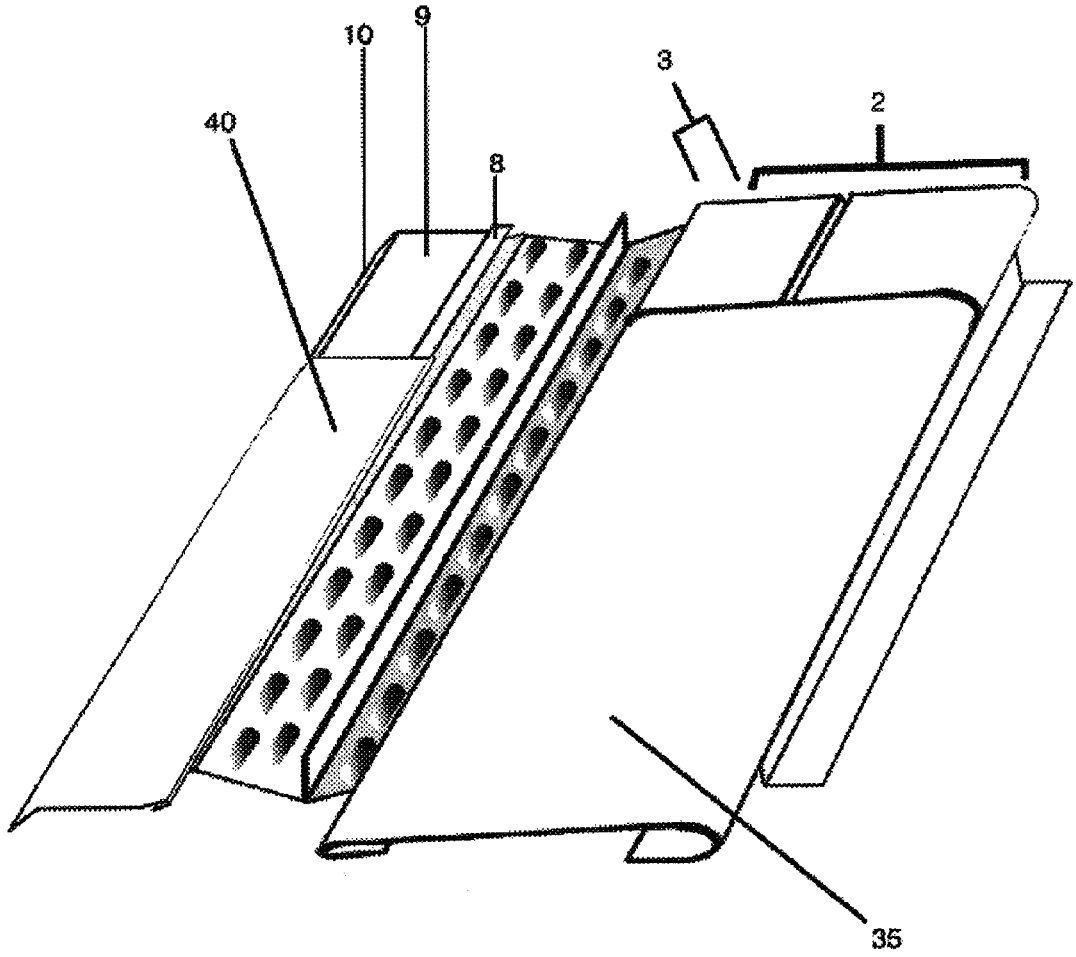

FIG. 12a. is a partial or fragmentary top perspective view of the main body of the present invention and of an optional covering sleeve component slid onto the top shelf of the main body of the present invention.

Figure 13:
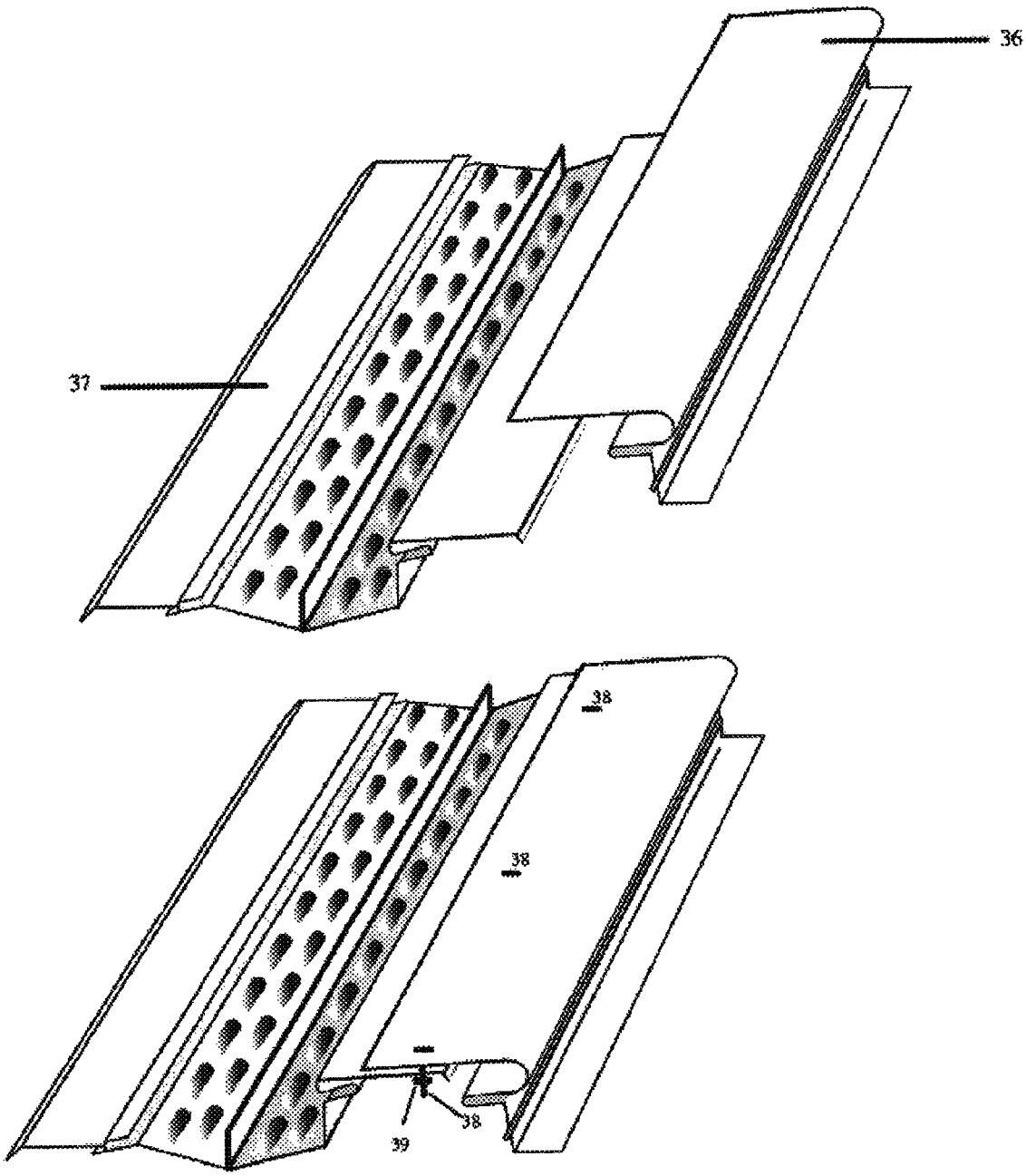

FIG. 13. displays top perspective views of the main body of the present invention illustrating an optional width-adjustable element or feature of the gutter cover.

DESCRIPTION OF THE PREFERRED EMBODIMENT

Referring now specifically to the drawings, a gutter cover (protector) body 1 with an insertable "multi-level filter" 32 according to the present invention is illustrated in FIG. 8. The gutter protector material is to be a polymer that is reduced to liquid form through screw compression of plastic "tags" or reduced to liquid form through other means. This liquid plastic mixture will then be extruded through a single block die embodying a profile of the body of the invention. The extruded material is rigid or semi-flexible PVC or Polypropylene or other heat, chemical, and UV resistant polymer. The preferred thickness of the extruded polymer material forming the gutter protector cover will range from 0.05 to 0.07 inches. The extruded material is suitably thick to maintain its shape and not deform or dip under load bearing weight of snow and ice or deform when exposed to high ambient temperatures which have caused prior art of lesser polymer thickness to deform vertically upwards and downwards allowing open-air gaps to form from one piece of prior art to the next when they rest abutted side by side. These gaps may allow debris entrance into a rain gutter. The PVC, Polypropylene, or other polymer will contain sufficient titanium oxide, carbon black, or other UV inhibitors to resist breakdown of structural integrity for a period of at least 10 years when exposed to normal cycles of "Florida Sun" (sunlight equivalent to that experienced over a 10 year period of outdoor exposure to weathering conditions in the state of Florida). The gutter protector body may be extruded in any length but it is preferred that the extruded body be cut into 4 to five foot lengths, at the point of manufacture, while exiting a plastics extrusion cooling tray. Such lengths may be installed by one individual while allowing for as few joints or seams as possible to exist when the present invention is installed over the length of a gutter. The extruded body is 5.4 inches wide.

Referring to FIG. 10 it is illustrated that the extruded body will rest inside the topmost opening of a conventional K-style 5 or 6 inch rain gutter 33 supported by spikes or "hidden hangars" 28 upon which the rear horizontal leg of the body 20 rests and supported by the front lip of the K-style rain gutter upon which the front "lip" 9 of the extruded body rests, such front lip 9 having an approximate length of 0.757 in.

FIG. 10 further illustrates the body may also be supported in the rear by affixing a flexible semi-concaved metal or plastic extrusion 27 (0.07 inches thickness or less) into the fascia board of a building structure and allowing it to extend outward away from the fascia board sufficient length to enable semi-concaved extrusion 27 to insert into the rear Channel 22 of the body to support the body at the rear. This may be desirable to ensure high winds may not uplift the extruded gutter cover out of the rain gutter as does occur with prior art. This may also ensure a level plane is created from one five length of the extruded body to the next at the rear in instances where reliance on gutter spikes for support of the rear portion of the extruded body may be inadvisable in instances where the gutter spikes may be driven at uneven heights through the rear of a rain gutter into a fascia board disallowing the extruded gutter cover 1 from maintaining a level horizontal plane between adjoining (abutted) pieces. A level plane from one gutter cover 1 to the next when installed inside a rain gutter is important to disallow vertical gaps from occurring between pieces as they may in prior art which may provide an entrance for debris into a rain gutter.

The profile of the body of the gutter protector illustrated in FIG. 1 shows the extruded body includes a rear horizontal leg 20 approximately 0.4 inches in length which may serve to rest on a gutter spike or hidden gutter hangar for a length of at least 0.4 inches at point of contact which serves to distribute any weight upon the gutter cover body over a greater surface area of a supporting spike or hanger than a simple extension of rear leg 19, whose approximate length is 0.6 in., would provide in the absence of rear horizontal leg 20.

FIG. 2 reference numeral 20 illustrates that a rear horizontal leg of the extruded body 1 is integral to the body and extends the entire length of the body and is perforated to allow rear drainage surface area in the event wind blown rain or melting ice flows rearward rather than forward into filtration [membrane] *configuration* 32.

FIG. 9 illustrates that rear horizontal leg 20 also may serve as a locking mechanism due to its positioning beneath hex-head or other screw fasteners 30 used to secure a hidden hangar and rear of a rain gutter to a fascia board in such instances when hidden hangars are the chosen method of fastening. It can be seen in FIG. 9a that rear horizontal leg 20 may also serve as a platform on which a mesh or other type filter 31 approximately ¾ to 1½ inch wide and one inch tall may rest to provide a rear barrier to debris that may possible be wind blown to the rear of the gutter protector body.

Referring, again, to FIG. 1 it can be seen that the extruded gutter cover body includes a rear support leg 19 that serves to provide rear vertical support for the gutter cover body and which includes "score lines" 21 which an installer may score with a utility knife or other scoring device if necessary. Such scoring will prevent running cracks up the rear support leg 19 from occurring if the rear support leg should ever need to be notched out to fit over a gutter spike that may be positioned too high through or above the rear of a rain gutter. In practice, in the field, improper positioning of the gutter spike occurs infrequently and may cause the gutter cover body to rest unevenly at varying heights inside the rain gutter necessitating that the rear support leg 19 and rear horizontal leg 20 be notched out to allow the rear of the gutter cover body to rest in a lower position inside the rain gutter to maintain an attractive low profile and smooth even-plane transition from section to section of the body of the present invention.

Referring again to FIG. 1, rear support leg 19 of the extruded body extends vertically upwards at an approximate 85-degree angle and an approximate 0.6-inch length. Support leg 19 then bends forward at approximately a 75 degree to 95-degree angle to form a shelf 23 approximately 0.2 inches in length. Shelf 23 extends upward approximately 90 degrees forming vertical leg 18 with an approximate length of 0.21 inches. Vertical leg 18 then angles forward approximately 90 degrees into a higher shelf 17 whose approximate length is 0.3 inches.

Referring now to FIG. 10 it is seen that bottom shelf 23, vertical leg 18, and higher shelf 17 of the extruded body form a recessed "receiving" channel 22 approximately 0.2 inches in depth and 0.07 inches wide which may serve to receive plastic or metal inserts or fasteners 27 that may be used to create a rear to forward tension mount of the extruded body.

Referring now to FIGS. 12 and 12a, it is illustrated that channel 22 may additionally [may] serve to act as [a] the first of two receiving channels of the extruded body *1*, the second receiving channel being channel [23] *24* that may receive and hold fast and permanently an aluminum, zinc, or copper metal cover 35 that may be clipped onto the extruded body *1*.

This clipped on cover 35 may serve to join two extruded body pieces together by spanning and covering the joint formed at their side-by-side abutment when such pieces are installed in a rain gutter. This clipped on cover 35 may further serve to provide fungicidal properties when made of zinc that would discourage moss mold or mildew growth on the invention, which is an improvement, not found in prior art. The clipped on cover 35 may further serve to allow color and material matching of the plastic extruded body to aluminum, copper, and other metal rain gutters which is an advantage and property not found or suggested in prior art. The co-use of two such materials, polymer and metal, in a leaf guard on copper or other expensive metal rain gutters would provide a great economical alternative to the use of solid copper leaf guards which naturally employ thicker and thereby more expensive copper in their design. The dimensions of such an extruded 0.019 or thinner metal cover would be such that it's underside 36 would be approximately 5 percent to 15 percent greater than the exterior portion of the extruded plastic body of the invention it covers. Such extruded metal cover may also serve to act as an extension for the plastic extruded body it covers to allow for a fit rain gutters larger than standard 5" K style gutters by widening the clip on metal shelf 35 to accommodate 6 inch or wider rain gutters.

Referring again to FIG. 1, shelf 17 extends horizontally 0.3 in. and then upward into a curve 2a such curve having an exterior radius of approximately 0.137 and an interior radius of approximately 0.073 inch. The reverse of curve 2a of the extruded body extends forward in a somewhat horizontal plane 2 angled downward approximately 5 degrees for a distance of approximately 1.5 to 1.75 inches. Horizontal plane 2 embodies a small recessed channel 59 across its entire length of sufficient depth to allow for scoring and breaking of the horizontal plane.

FIG. 13 illustrates such scoring and breaking of recessed channel 59 may be optionally employed by the installer in instances where a horizontally compressed rain gutter does not allow for easy installation of the invention: the severed rear portion *36* of the extruded body [36] *1* may then be placed over the front severed portion *37* of the extruded body [37] *1* as illustrated in FIG. 13 and affixed by polymer cement or fasteners such as plastic bolt 38 and plastic nut 39 creating such overlap distance of the rear severed portion *36* of the extruded body *1* over the front severed [extrusion] *portion 37* of the [severed] *extruded* body *1* as the installer deems necessary to create an ideal adjusted extruded body width for placement in a horizontally compressed portion of a rain gutter.

Referring again to FIG. 1, Horizontal plane 2, after extending a distance of approximately 1.5 inches, will then "fork" into two extensions: one extension[;] 3, continues to extend outward angled downward from the 1.5 inch point an additional 5 to 10 degrees to form a top shelf approximately 0.28 inch in length. The other extension 4 of Horizontal plane 2 extends downward at an approximate 85 degree angle for a distance of 0.125 inches and then angles forward 90 degrees into a plane 16 approximately 0.28 inches in length. Extension 3, extension 4 and plane 16 form a recessed "receiving" channel 24 with a depth of approximately 0.28 inch and a width 55 of approximately 0.125 inch which serves to secure the edge of the [multi level filter portion] *filtration configuration 32* of the invention and to receive, if opted for, the curved edge of a metal cover *35* which may be clipped onto Curve 2a, Horizontal plane 2, and extension 3 as illustrated in FIG. 12a.

Referring again to FIG. 1; Plane 16 of the extruded body continues and then angles sharply downward at an approximate 80 to 85 degree angle for a distance of approximately 0.4 inches to form plane 5. Plane 5 extends downward and then angles forward at an approximate 22-degree angle-forming plane 15. Plane 15 has an approximate length of 0.94 inch and is perforated as illustrated in FIG. 2 with perforations 0 approximately 0.065 inch wide, 0.125 long. Perforations 0 are aligned end-to-end and spaced approximately ¼ inch apart in rows, which extend the length of the extruded body, such rows being spaced approximately 0.145 inch apart.

Referring again to FIG. 1, Plane 15 forks into an extension and a continuance: the extension of plane 15 is plane 6 which extends upwards as an extension of plane 15 at an approximate 90 degree angle. Plane 6 will act as a support for the insertable filter portion of the invention and presents an improvement not found in prior art in that it will act as a dam that forces water to back up and drip through the rear most rows of perforations of plane 15 rather than continue forward with enough speed and depth of water flow to spill over the front lip of the rain gutter *33*. Such occurrence of water spill is common in prior art, which relies solely on water adhesion principals. Planes 5, 15, and 6 of the extruded body *1* form a water receiving well with a perforated bottom shelf 15 that will direct water into a rain gutter *33* when acting in conjunction with the water dam formed by plane 6 as described in the preceding sentence. Referring again to FIG. 1, Plane 15, in addition to forking upwards into plane 6 also continues on at an approximate 22 degree upward angle beginning at the base of Plane 6 and extends into a perforated plane 13 approximately 0.95 inch long. This angling upward of plane 13 toward the front lip of the gutter *33* presents an improvement not found in prior art in that water which contacts plane 13 will not continue on a forward flow toward the top front lip of a rain gutter *33* due to water adhesion principals where it may then spill outside the rain gutter *33*. Instead, the water that contacts plane 13 will follow the downward angling plane 13 and be more surely and intentionally directed into a rain gutter *33*. The perforations *0* of plane 13 are identical to those of plane 15: 0.065 inch wide, 0.125 long, each perforation spaced end to end approximately 0.25 inches aligned in rows the length of the extruded body *1* such rows being spaced approximately 0.145 inch apart. Plane 13 extends forward approximate 0.95 in and then angles downward approximately 16 degrees into plane 12. Plane 12 extends forward approximately 0.33 inch at which point it forks into an extension and a continuance: the extension, plane 7, forks upward at an approximate 80 degree angle for a distance of approximately 0.14 inch at which point plane 7 terminates in a "T" configuration. The "T" configuration has a rearward (toward the rear of the extruded body) horizontally extending section, plane 8, having a length of approximately 0.25 inch. Receiving channel [24a] *25* is formed by planes 12, 7, and 8 and such channel has an approximate width 56 of 0.125 inch. This channel acts to receive and secure the forward edge [54] *52* of supporting skeletal filter component [57] *43* as illustrated in FIG. 8. The forward extension of the "T" is an extending plane, 9, that angles approximately 7 degrees downward for a distance of approximately 0.757 inch where it then angles downward 45 degrees into plane 10, which measures approximately 0.45 inch in length. The continuance of plane 12 is for a distance of approximately 0.24 inches after its vertical fork[;] , plane 7 giving plane 12 a total length of 0.57 inch.

Referring again to FIG. 1 it may be seen that planes 6,13, 12,7, and 8 form a receiving well of the extruded body which will direct rain water through its perforations *0* into a rain gutter *33*. FIG. 1, planes 12,7, and 8 further illustrate a recessed receiving channel [24] *25* that may receive and secure both an inserted edge of the [multi filter] *filtration configuration 32* employed by the invention as is illustrated in FIG. 7 and FIG. 8.

FIG. 12a illustrates that a "clip on" metal cover 40 may be inserted over planes 8, 9, and 10 to achieve an optional aesthetic matching of colored aluminum or copper between the present invention and the underlying gutter it protects and/or to achieve the improvements previously described in the last sentence of page 4 and the fist sentence of page 5 of this disclosure.

FIG. 11 illustrates Channel 22 may serve as a receiving channel for polymer, metal, or other semi-flexible formed or extruded inserts with profiles similar to extension 41 which may be placed or affixed with adhesives into Channel 22 and may then serve as an extension of the extruded body 1 which extends rearward and compresses against the rear wall of a rain gutter, hidden hangar, or fascia board to create a rear to forward tension mount of the extruded body into the rain gutter at the discretion of the installer. The amount of mounting tension created may be varied by the length of the top shelf 42 of the extruded or formed extension 41.

Referring now to FIG. 3 there is illustrated the profile of a perforated filter skeleton 43. The width of filter skeleton 43 is approximately 2.5 inches and is an extruded polymer of approximately 0.04 to 0.06 inches. Plane 44 is approximately 0.58 inch and contains perforations 0, such perforations being of elliptical shape approximately 0.45 inches long and 0.22 inch wide. The perforations 0 are positioned as close to vertical leg 45 as possible and have a wider top opening than bottom creating a taper which more readily captures and directs rain water than a simple straight through punch. Horizontal plane 44 t-junctions into vertical leg 45 whose approximate length is 0.35 inch. Leg 45 has a curved bottom 46, such curved surface facilitating the dropping of water off of leg 45 downward into the rain gutter. Leg 45 is capped by ellipse 47. Ellipse 47 has dimensions of approximately 0.13 inch width and 0.08 inch height.

The elliptical curved surfaces 47 resting on vertical legs 45, create water-channeling paths that exhibit siphoning effects stronger than has been realized in prior art. These "t" configurations, as well as their approximate spacing of 0.19 inch from subsequent ellipses and legs, create act as an ideal support for warp-knitted filter membrane 50 (shown in FIG. 5 in an exploded view): Such "t" configurations, and their spacing, enhance the self-cleaning properties inherent in filter membrane 50. Additionally, they present a breaking of any water channeling paths to the front of a rain gutter lip noted in prior art.

FIG. 6 illustrates that filter membrane 50 will be affixed to filter skeleton 43. The downward curves and spacing of the ellipses 47 offer an improvement over prior art in creating multiple curved surface water channels that direct toward a vertical leg resting on a horizontal perforated plane that employs downward extending legs to continue the flow of water downward rather than forward. This configuration creates stronger siphoning action than is created in prior art relying on elliptical ocean-wave shapes to channel water or downward extrusions positioned beneath perforations or screens. The channeling of water almost fully around an ellipse that is broken by a vertical downward extending leg better captures water and directs it downward preventing back-flow of received water against incoming water noted in prior art. Vertical legs 45 downward extensions beneath planes 44 and 48 ensure the water adhesion of flowing rain water is broken at the most opportune moment to ensure the directed flow of water into a rain gutter. Perforated planes 48 are approximately 0.25 inches in width. Viewing from right to left, the extruded filter skeleton continues from the first vertical leg 45 whose length is approximately 0.35 inch into an upward extension where it terminates into an ellipse 47. Vertical leg 45 is intersected approximately 0.2 inch down by forward extending perforated horizontal plane 48. Planes 48 are approximately 0.25 inches in length.

Perforated plane 48 continues forward until it intersects the second vertical leg 45 approximately 0.2 inch below ellipse 47. Vertical leg 45 extends approximately 0.22 inch downward from perforated plane 48 in order to break any surface tension of water adhering to perforated plane 48 and redirect it downward into a rain gutter. A second perforated plane 48 extends forward horizontally from a second vertical leg 45 until it intersects a third vertical leg 45. Third vertical leg 45 is capped by an ellipse 47 as are all vertical legs of filter skeleton 43. A third perforated plane 48 extends forward horizontally from third vertical leg 45 until it intersects a vertical leg 51 whose length from ellipse 47 to it's lower most surface 46 is approximately 0.45 inch. A fourth perforated plane 48 extends forward horizontally from vertical leg 51 for a distance of approximately 0.25 inch where it then right angles upward into a vertical leg 54 whose approximate length is 0.2 inch. Vertical leg 54 extends upward into an ellipse 47. Directly beneath the ellipse which caps vertical leg 54, a horizontal perforated plane [55] *52* extends forward for a distance of approximately 0.45 inch. Planes 44 and 52 each have the endmost section of their length non-perforated to allow space for a sewing seam. [filter] *Filter* membrane 50 will be sewn onto filter skeleton 43 at these endmost sections of planes 44 and 52.

Referring to FIG. 3 and viewing supporting skeletal component [57] *43* left to right: each combination left to right of ellipse 47, vertical leg 54, perforated plane 48, vertical leg 51, ellipse 47 and of ellipse 47, vertical leg 51, perforated plane 48, vertical leg 45, ellipse 47*;* and of ellipse 47, vertical leg 45, perforated plane 48, vertical leg 45, ellipse 47*,* creates water receiving wells whose components (by means of their structural configuration and spacing) act to slow the flow of rainwater as well as capture and direct rain water downward into a rain gutter *33* in an improved manner over prior art. It can be seen in FIGS. 3 and 4, that planes 44 and 52 are positioned on higher planes than planes 48. This is done to allow the top of the elliptical planes 47 to remain on a level or slightly recessed plane with planes 3 and 8 of the extruded body as illustrated in FIG. 11. This will disallow a damming effect that could lead to debris build up behind the insertable filter and encourage debris to fall or be wind blown off of the invention.

It can also be seen in FIG. 11 that, viewing from right to left, the third vertical leg 45 abuts the upward extending leg 6 of the extruded body. This feature discourages the product from shifting. Referring again to FIG. 3 it can be seen that, viewing from right to left, the forth leg 51 is of greater length than the preceding downward extending legs 45. The length of leg 51 is approximately 0.48 inch. This illustrates that the length of legs may vary to prevent forward flow of water to the front of the gutter by decreasing water tension paths along the bottom of the filter membrane. The ellipses, too, may exist at different planes which would further facilitate the capturing of rainwater and the direction of it downward into the rain gutter.

Referring again to FIG. 3 it is seen that vertical leg 54 does not extend beneath perforated plane 48. The reason for this is illustrated in FIG. 7 where it is seen that extending vertical leg 54 beneath the plane 48 would cause the filter skeleton to rise above a level or slightly recessed plane than exists between 3 and 8 of the extruded body. An extension of vertical leg 54 beneath perforated plane 48 would cause it to contact plane 13 and push the filter skeleton upwards. The vertical height of vertical leg 54 is approximately 0.17 inches from its bottom most surface up to the point it contacts ellipse 47.

FIG. 5 is an exploded view of filter membrane 50, the type of filtration fabric illustrated affixed to filter skeleton 43 as illustrated in FIG. 6. It can be seen in FIG. 5 that small cylindrical threads of polymer extrusion 55 are made to pass through larger threads 56. This unique method of fabric formation offers an improvement over prior art in that this configuration of smaller curved surfaces passing through, rather than woven or knitted above and beneath larger threads, increases the fabric's ability to capture and direct water. This method of fabric formation offers another improvement over prior art in that it encourages dirt and debris to be less likely to be retained by the fabric and therefore less likely to clog the filtration cloth than other filters employed in prior art: woven, weaved, knitted, non-woven lofty, are able to accomplish. The largest distance between any two larger threads is to be less than 8/100 of an inch, which prevents the smallest of debris from lodging within an open (space between threads. The preferred embodiment of this invention is illustrated in FIG. 9 and FIG. 12a.: An extruded polymer body with extruded multi level filter that employs water receiving channels framed by curved ellipses resting on vertical supporting, lower extending legs covered by a filtration cloth as illustrated in FIG. 5 and FIG. 6 with a slide on or clip on metal covers as illustrated in FIG. 12a.

Operation of the Main Embodiment

Referring to FIG. 9, there is illustrated the present invention: a gutter protection system that consists of a main body 1 and an insertable filter skeleton 43 covered with a filter membrane 50. Filter Membrane 50 is composed of intersecting threads. (An exploded view of the interconnecting structure of the threads is illustrated in FIG. 5).

Referring to FIG. 10 The present invention is illustrated as inserted into the top water receiving opening of a k-style rain gutter 33 and resting on a gutter hangar 28. It is illustrated that the present invention rests wholly beneath the sub roof 60 and roofing membrane 61 of a building structure.

Referring to FIG. 12, it is illustrated that the present invention will be affixed to an existing rain gutter in two stages. First, a main body 1 will be placed inside the open top of a rain gutter and then may be secured in place by several means: Rear horizontal leg 20 will rest upon a hidden hangar 28 and prevent body 1 from displacing by locking beneath the head of fastening screw 30. The front of the present invention is snapped into place and secured to the front lip of the k-style gutter by planes 9,7, & 11 of the body.

Sub-heading 1

Covering of Joints, Aligning of Adjoining Sections, and Color Matching

Once this is accomplished, main body 1 offers improvement over prior art in offering a method of aligning adjoining sections of the invention in a manner that allows joints between adjoining body members to be covered. This covering of joints and joining of abutted sections of the invention is accomplished by means of a roll-formed or "braked" sleeve (see FIGS. 12 and 12a, sleeve 35). The resulting absence of debris-allowing joints is not realized in prior art intended to retrofit existing rain gutters.

Referring FIG. 1, there is illustrated a recessed channel 22. Recessed channel 22 acts as the first of two receiving wells 22 & 24 for a roll-formed or job-site "braked" metallic cover 35 which may be clipped onto the top shelf 2 of the present invention (see FIGS. 12 & 12a). This feature offers improvement over prior art in that no prior art offers the ability to specifically color match to it's underlying rain gutter at the time of installation. The present invention allows the installer to quickly break matching gutter coil to clip into and cover top shelf 2 and top shelf 9 as is illustrated in FIG. 12a. Metallic sleeves 35 & 40 may also serve to further align each sectioned body of the present invention and maintain consistent edges and heights between adjoining bodies. This is an optimal method of ensuring consistency of height and edge alignment between adjacent sections not known in prior art.

Sub-heading 2

Vertical Height and Horizontal Width Adjustments

Another improvement achieved by the present invention, not known in prior art, is its ability to provide a means of extending body width to accommodate standard sized commercial sized gutters with 4, 5, 6, and 7 inch widths. Widening may be accomplished by breaking or rollforming the metal cover 35 (FIG. 12a) to a width wide enough to effectively extend the present invention's body rearward.

Sub-heading 2a

Vertical Adjustments

In the event body 1 is installed in a rain gutter affixed to a fascia board by gutter spikes, the present invention offers an improvement not found in prior art by offering a quick, at-the-point-of-installation, method of adjusting the height of the body to ensure it remains consistent. The body 1 of the present invention offers improvement over prior art by allowing for adjustment of it's rear vertical leg 19 by scoring and breaking of the rear leg at points 21. It is known gutter spikes, often employed to secure a rain gutter to a fascia board, are driven in and remain at uneven heights at the rear of the rain gutter. Prior art, which requires a supporting of a rear leg or rearward part of invention body, has not foreseen or allowed for simple height adjustments to be made, which would accommodate prior art bodies to supporting, gutter spikes. Such adjustments may be necessary to maintain a consistent level height of gutter protection units for cosmetic as well as functional reasons.

The improvement accomplished by the present invention is that such height adjustment may be accomplished quickly at the point of installation with a simple blade (to score point 21) and pair of scissor snips to clip the rear leg structure from rear horizontal leg 20 up through rear vertical leg 19 to the scored recess 21. The scored mark ensures that the portion of rear vertical leg 19 so scored and cut will break off easily. Prior art does not allow for such simple controlled height adjustment at the point of installation (possibly while the installer is on an extension ladder).

Sub-heading 2b

Width Adjustments

The body 1 of the present invention offers another improvement over prior art designed to be inserted into the top of a rain gutter, rather than rest upon the top surface of a subroof or roofing membrane, such as U.S. Pat. No. 6,134,843 to Tregear, U.S. Pat. No. 5,619,825 to Leroney, etc,. by allowing for adjustment of the main body by means of a pre-scored recessed channel 59 (FIGS. 2 & 13). Scoring of channel 59 allows the clean breaking and refastening of the body 1 to achieve a means of adjusting the present invention to accommodate both 4 inch and 5 inch gutters. FIG. 13 illustrates that the body 1 of the present invention may broken, then rejoined in a fashion that creates shorter body widths to accommodate the varying widths of a single run of gutter length. It is known that lengths of installed gutter seldom maintain a consistent width due to irregularities in fascia boards they are attached to. Prior art such as is illustrated in U.S. Pat. No. 5,495,694 to Kuhns, U.S. Pat. No. 5,459,965 to Meckstroth, etc., that require a resting of their body on top of or directly beneath shingles or other roofing materials do not have an intrinsic ability to accommodate varying gutter widths. This leads to such prior art presenting an uneven appearance along their rear edges which varies with the uneven width of a gutter they are attached to. This unevenness of edges at the rear of such products, as well as the dipping of subroof structures that often occur beneath the shingles such prior art may rest upon or be affixed to, allows open air spaces to exist at the rear of such products or from side-edge to side-edge of adjoining pieces. Debris may then enter through into a rain gutter or become trapped in the open air spaces. Because this problem is known, installers of prior art are known to screw the rear of such products into their underlying supporting roof structure, which can present the potential for roof leaks and the voiding of roofing manufacture warranties.

Prior art has offered limited adjustment of width, usually by relying on body tension to extend width, as illustrated in such prior art as U.S. Pat. No. 5,619,825 to Leroney, but such extension of body width found in prior art is meant only accommodate one gutter width i.e.: 5 inch or 6 inch and does not allow for utilization of prior art over a span of varying standard gutter widths. Added width of span accomplished by tension weakens the strength of such invention's affixture to the raingutter since the pressure of tension is weakened. Prior art does not allow for the shrinking or widening of body width offered by the present invention in such fashion as to allow installations on narrower gutter widths than 5 inch or as to allow consistently secure installations on wider gutter widths than 5 inch.

Prior art that does allow for installation on varying standard gutter widths such as is found in U.S. Pat.. No. 5,660,001 to Albracht and U.S. Pat. No. 5,640,8090 etc, is undesirable because of the required securing of such prior to or beneath roofing membranes, which has been found to cause failures of roofing membrane integrity.

Sub-heading 3

Water Receiving Wells

Referring again to FIG. 2 it is illustrated that the body 1 incorporates two recessed perforated planes 13 & 15, separated by a vertical leg 6. Both planes angle downward and inward into the body of an underlying raingutter. This allows the present invention to offer improvement over prior art as follows:

Referring to FIG. 1: there is illustrated two recessed water-receiving perforated wells 15 and 13, which direct water, flow downward to a vertical leg 6. The downward angle of perforated well 13, away from the front lip 9 and front lip of a rain gutter offers improvement over prior art U.S. Pat. No. 5,595,027 to Vail, U.S. Pat. No. 5,956,904 to Gentry, U.S. Pat. No. 5,619,825 to Leroney, U.S. Pat. No. 4,841,686 to Rees, U.S. Pat. No. 6,134,843 to Tregear, and other prior art in that it forces water to cease any forward flow to the front of a rain gutter where it may spill past the raingutter as has been noted in prior art. Prior art has not effectively dealt with this noted problem. Reverse curved and hooded gutter protection methods such as U.S. Pat. No. 5,491,998 to Hansen do redirect water flow rearward into the raingutter but have not recognized the noted tendency of debris to follow the water around the curved surfaces they employ into the rain gutter as well. Additionally, such prior art is known to lose most of it's water adhesive properties over time as pollen, oil leaching from asphalt shingles, and other pollutants, coat and remain on the curved surfaces such prior art employs. Downward sloping plane 15, also, prevents forward flow and resulting spilling of water to the ground, by acting in conjunction with vertical leg 6. Vertical leg 6, serves the dual purpose of acting as a center and downward water channeling support for the filtration membrane 50 and Skeleton 43 (See FIG. 9), and as serving as a dam that slows forward rushing water in recessed well 5,15,6 to slow and drain through the perforated plane 15.

Sub-heading 4

Filter Membrane and Skeleton

Once installation and, if necessary, adjustment of the body and/or covering of the body 1 of the present invention is achieved, a filter membrane and skeleton will then be inserted into the recessed channel of the present invention. (See FIG. 2, then FIG. 8 and FIG. 9).

Several improvements over prior art are offered by the filter membrane and skeleton employed by the present invention:

Sub-heading 4a

Filter Skeleton

Referring now to FIG. 3 there is illustrated a filter member: a multi-level supporting structure upon which a wire or cloth membrane composed of intersecting threads shall rest. Prior art employing filtration cloth or membrane, which rests over open apertures e.g.: U.S. Pat. No. 5,595,027 to Vail, U.S. Pat. No. 5,956,904 to Gentry, U.S. Pat. No. 5,619,825 to Leroney, U.S. Pat. No. 4,841,686 to Rees, U.S. Pat. No. 6,134,843 to Tregear, etc. exhibits a property of preventing rainwater from entering the open apertures beneath the filtration cloth. In practice, in the field, it is often observed that volumes of water will travel around the underlying perforations, beneath the filter cloth or membrane covering them, due to water adhesion principals. The water will then feed toward the front of prior art, rather down beneath it and into a rain gutter, and will flow past the top front lip of a rain gutter.

This common occurrence in prior art occurs for several reasons.

Perforated surfaces existing in a single plane, such as is employed in U.S. Pat. No 5,595,027 to Vail, or as exists in the Commercial Product SHEERFLOW. RTM. Manufactured by L. B. Plastics of N.C., and similar prior art tend to channel water inventions sought to correct this undesirable property by either tapering the rim of the open perforation and/or creating downward extensions of the perforation (creating a water channeling path down through open air space) as exhibited in prior art U.S. Pat. No. 6,151,837 to Ealer, or by creating dams on the plane the perforations exist on, as exhibited in prior art U.S. Pat. No. 4,727,689 to Bosler. Such prior art has been unable to ensure all water would channel into the underlying rain gutter because the water, that did, indeed, travel through the open apertures on the top side of these types of perforated planes or screens, would also travel along the underside of the screen wires or perforated planes, as it had on top of these surfaces, and still continue it's undesirable flow to the front of the invention and front lip of the underlying rain gutter, due to water adhesion. Additionally, this "underflow" of water on the underside of the perforated planes and screens illustrated in prior art exhibits a tendency to "back flow" or attempt to flow upwards through the perforations inhibiting downward flow of water. This phenomenon has been noted in practice, in the field when it has been observed that open air apertures appear filled with water while accomplishing no downward flow of water into the underlying rain gutter.

Other inventors sought to eliminate this undesirable property by employing linear rods with complete open air space existing between each rod, This method of channeling more of the water into the rain gutter exhibits more success on the top surface of such inventions, but it fails to eliminate the "under channeling" of rainwater toward the front of the invention due to the propensity of water to follow the unbroken interconnected supporting rods or structure beneath the top layer of rods.

Referring again to FIG. 3, the structure of the present invention improves the flow of water into the rain gutter over prior art, significantly, as has been observed in practice, in the field. This improvement is accomplished by allowing cylindrical rods 47, with unbroken air space existing between them, to rest upon vertical leg supporting structures, which disallow any connecting path for forward water channeling due to water adhesion. Supporting structures 45, 46, 51, & 54 are, indeed, each connected to the other by perforated planes 48. However, this connection is broken by several factors, which disallow a forward flow of water. Water, instead, is forced downward into the rain gutter with no water adhesive path toward the front of the invention existing. This is accomplished by resting the rods 47 on slim vertical supports 45,46, 51,& 54. Doing so creates a "t" configuration unlike the simple rod structures of prior art. The present invention is an improvement in two instances: First, water that channels around simple rods, rather than "t" structures exhibits less siphoning action due to the water colliding on the underside of the rod after traveling down the opposing curved sides of the rod. This collision of water slows downward water flow by creating a back flow or upward flow of water against the rainwater attempting to channel downward along the curved surfaces of the rod. The "T" configuration of the present invention prevents such reverse flow or back flow of water against the incoming water flow by creating a continuing path of water flow away from water traveling down the opposite side of the "t". This allows the filter skeleton 43 to create a stronger channeling or siphoning action on the incoming rainwater than prior art is able to exhibit.

The "t" configuration also offers improvement over prior art because it creates an absolute break in the water adhesion flow on the bottoms of vertical legs 45, 46, 51, & 54. Water which will travel down rods 47, then though the open air apertures 0 which exist in planes 48, will next adhere to and travel down the lower (beneath planes 48) portions of the vertical legs of the "t". Water traveling down the vertical legs, at this point, is an improvement over prior art such as U.S. Pat. No. 5,595,027 to Vail, U.S. Pat. No. 5,956,904 to Gentry, U.S. Pat. No. 5,619,825 to Leroney, U.S. Pat. No. 4,841,686 to Rees, U.S. Pat. No. 6,134,843 to Tregear, because it has discontinued it's forward flowing path on the underside of the perforated plane, as is common in the prior art, and is now being channeled, again, downward toward the inside of the rain gutter. Prior art, U.S. Pat. No. 4,745,710 also temporarily accomplishes this downward flow utilizing it's rod-supporting structure, but not nearly as effectively due to the interconnection of the underlying support structure, which provides a forward flowing water path by means of water adhesion along an unbroken surface. The improvement of the "t" configuration over prior art is again accomplished by a third, completely disconnected path of water flow, achieved at the lower termination of the vertical legs 45, 46, 51, & 54. Water, at these points, may only flow downward into the rain gutter. This is due to the length of the downward extensions of the vertical legs, which, by design, disallow backflow of water on the underside of the perforated planes 48, or forward flow of water along a water adhesion path to the front lip of the rain-gutter.

Filter Skeletal structure 43 of the present invention creates a siphoning action and ensures a downward, rather than forward flow of water not exhibited by prior art. Referring to FIG. 5 there is illustrated a cloth or wire filter membrane 50, which employs intersecting threads. This membrane exhibits an improvement over other filtering and screening methods illustrated, representatively, in prior art U.S. Pat. No. 5,595,027 to Vail, U.S. Pat. No. 5,956,904 to Gentry, U.S. Pat. No. 5,619,825 to Leroney, U.S. Pat. No. 4,841,686 to Rees, U.S. Pat. No. 6,134,843 to Tregear, etching that it exhibits no tendency to trap and hold debris. The above mentioned prior art, even when employing micro-aperatured cloth, (due to adhesive actions of pollen, oil, pollutants, and silica dust which tend to heal over such products and remain impervious to cleaning by wind or water) has been observed, in the field, to clog due to tendencies to trap and hold debris, thereby channeling water past, rather than into the under lying rain gutter.

Sub Heading 4b

Filter Membrane

Prior art, though naming filtering medium as cloth or screen or tangled mesh, has not recognized or utilized the improvements offered by a filtering membrane accomplished by the intersection of material of equal or larger and smaller wire, or cloth, or plastic thread configurations as is illustrated in FIG. 5.

Filtering and screening methods illustrated in prior art attempted to improve the propensity of reverse-curved or hooded gutter protection systems illustrated in prior art U.S. Pat. No. 5,557,891 to Albracht, and similar inventions, to trap and hold debris within their open channels. When this has occurred, water has flowed past the clogged open channels and to the ground due to waters tendency to bridge over debris trapped in a concave aperture.

When debris rests on planar surfaces, water will travel beneath, rather than bridge over them, and attempt to travel through any open-air openings or apertures that exist beneath the debris. Filter and screening methods of gutter protection, however, illustrated in prior art have employed woven or knitted or mesh fibers or wires which intrinsically contain numerous joints, which tend to trap and hold debris. Filtering cloths, screens, and meshes are known to trap and hold debris to protect a medium on the other side of the filter. Screens, too, are known to trap and hold debris. When any of these methods of gutter protection have been employed in prior art, such inventions have been known to trap and hold debris reducing the amount of water that is able to enter an underlying rain gutter regardless of the porosity and/or density of the filter medium.

The present invention exhibits no tendency to trap and hold debris, or dirt, or pollen and thereby offers a significant improvement over prior art. The present invention offers an improvement over prior art in that it's filtering membrane 50, offers far fewer under and over knitted or woven or meshed joints for debris to become lodged within. The present invention also offers improvement over prior art in the existence of a strong water channeling action taking place beneath filtering membrane 50 throughout the structure of filter skeleton 43. The water adhesive effects, strong siphoning action, and ultimate breaking of the water adhesion and resulting continued downward flow of water into an underlying rain gutter accomplished by the filter configuration illustrated in FIG. 6 offers improvements not found in prior art. Referring again to FIGS. 5 & 6, the present invention also exhibits an ability to clean or wash smaller particles out of the 100 micron openings existing between the interconnected threads or wires it employs. This ability has not been noted in prior art but, rather, prior art is known to clog with debris or cake over with pollen, leached shingle oil, dirt, and other pollutants and has not exhibited an ability to self-clean, found in the present invention. The present invention is an improvement over prior art that employs insertable, or under-affixed, or recessed filters such as is employed and illustrated in U.S. Pat. No. 5,595,027 to Vail, U.S. Pat. No. 5,956,904 to Gentry, U.S. Pat. No. 5,619,825 to Leroney, U.S. Pat. No. 4,841,686 to Rees, U.S. Pat. No. 6,134,843 to Tregear and similar prior art because these previous filtration attempts are known to either clog, heal over and become water-proof, and/or channel water forward.

Recessed filters beneath a perforated plane such as employed in U.S. Pat. No. 5,595,027 to Vail receive far less water than the present invention due to water adhesion principals that direct water around, rather than through simple perforations. Filtration cloths or membranes resting on top of or sandwiched between screens, perforated planes, or denser filter mediums such as is illustrated in prior art U.S. Pat. No. 4,841,686 to Rees, U.S. Pat. No. 5,595,027 to Vail, U.S. Pat. No. 6,134,843 to Tregear and similar devices are also known to allow water channeling to the front lip of a rain gutter due to the unbroken inter-connected supporting or securing structures beneath or surrounding the filtering membrane and also due to the linear, rather than downward, channeling of water such filtering membranes themselves are known to exhibit in the field.

REFERENCE NUMERALS IN DRAWINGS

0 perforations
1 extruded body
2 "scorable" [top shelf] *fourth planar surface*
3-4-16 top, side, and bottom planes of 2$^{nd}$ u-channel
5 vertical leg
[13-16] *13, 15* v-shaped perforated well
6 vertical leg/"water dam"
12-7-8 bottom[-], side and top planes of 1$^{st}$ u-channel
9-10 front "lip" of body
17-18-[26] *23* top, side, and bottom planes of 3$^{rd}$ u-channel
20 reverse curved plane
22 open channel
19-20 rear supporting leg
21 pre-scored indentations
23 [pre-scored indentation] *shelf*
24 open channel
25 open channel
28 [rain gutter] *hidden gutter hanger*
29 rear u-shaped wall of gutter hangar
27 [tensioning/securing flange] *flexible, semi-concaved metal or plastic extrusion*
30 fastening screw
31 filter material
32 filtration [membrane] *configuration*
*33 rain gutter*
35 "braked" or formed clip on cover
43 filtration skeletal structure
44 rear ledge of skeletal structure
45 "water drops" of equal length
46 termination of "water drops"
47 ellipses
48 width of perforated plane section
50 filter membrane
51 "water drop" of greater length
52 front ledge of skeletal structure
54 vertical leg
57 forward ledge of skeletal structure
*59 pre-scored indentation*

I claim:

[1. A gutter shield device for mounting in an open top of a rain gutter attached to an edge of a roof, said gutter shield comprising:

(a) an elongated sheet of extruded material having four interconnected planes wherein the sheet comprises:

a first plane for resting on a front lip of the rain gutter, the first plane connected to a second plane by a u-shaped channel lying beneath the surface of the first plane the second plane is perforated and angles downward and inward toward a center of the sheet in a manner to break a forward flow of water adhesive channeling paths for redirecting water downward and inward into the gutter; said second perforated plane terminating and adjoining at a lower most edge to a vertical leg that serves as a supporting structure for an insertable filtration configuration; said vertical leg additionally serving to join a third perforated plane that angles upward from said second perforated plane and upward and away from the center of the sheet in a manner for redirecting a forward flow of water downward to said vertical leg that also serves as a dam for the flowing water ensuring that the water will pool and drop through the perforations of said third perforated plane; said third perforated plane is joined, by means of an upward extending vertical wall that is capped by an integral u-shaped channel positioned at an uppermost edge of the vertical wall, a fourth plane angles slightly upward from the vertical wall, and said filtration configuration comprising a filter membrane resting on a skeletal structure that embodies ellipses resting on centered, underlying vertical legs, said legs resting on and extending above a perforated plane, said perforated plane having underlying vertical legs that are adapted to further direct the downward channeling of water into the rain gutter and also disallowing forward channeling of water due to the spacing and vertical downward extension of said vertical legs, whereby a forward rush of water is broken and redirected by said planes, ellipses, and vertical legs, wherein said ellipses and vertical legs are adapted to be separated by unbroken air space, in a manner that enables the sheet to self-clean clogging elements selected from a group consisting of scum, oils, pollen paste, matted silica, and other scum forming elements off said filter membrane to an extent that disallows said clogging elements from healing over and clogging water receiving areas of said filtration combination.]

[2. The gutter shield device according to claim 1 wherein said fourth plane is embedded with a recessed scoring channel on its upper surface that facilitates a clean breaking of the fourth plane on a jobsite at the time of installation, for the purpose of rejoining the fourth plane in an overlapped manner that effectively narrows the width of said sheet to allow for installation in compressed rain gutters or in rain gutters with standard 4-inch or 3-inch openings.]

[3. The gutter shield device according to claim 1, wherein said fourth plane is adapted to receive a metal cover of the same material and color of the rain gutter.]

[4. The gutter shield device according to claim 1, wherein said filter membrane is comprised of a plurality of threads adjoining or passing through a plurality of larger threads at a centermost point of the larger threads.]

[5. The gutter shield device according to claim 1 wherein said filter membrane resting on said oval ellipses is secured at the outer edges of said skeletal structure by means of sewn thread.]

[6. The gutter shield device according to claim 1 wherein said filtration configuration is received in an upper top channel formed by said second and third planes by inserting edges of said filtration configuration into the u-shaped channels attached to the second and third planes.]

[7. The gutter shield device according to claim 1, wherein said ellipses are optimally spaced end-to-end at approximately 0.19 inch intervals, wherein sufficient support is provided to prevent extensive sagging of said filtration membrane while simultaneously ensuring sufficient open space exists between said ellipses to accommodate large amounts of rain water passage.]

*8. A filter assembly, comprising:*

*a filter membrane defining a first surface and a second surface; and*

*a skeletal structure beneath the filter membrane and bounded by longitudinally extending ends, the skeletal structure including:*

*a perforated plane spaced from the first surface of the filter membrane; and*

*a first leg disposed on the perforated plane intermediate the longitudinally extending ends and extending along a length of the skeletal structure above the perforated plane, wherein the first leg extends toward and contacts the first surface of the filter membrane, whereby when the filter assembly is installed in the open top of a rain gutter, water flowing across the filter membrane in a direction normal to the length of the skeletal structure is redirected downward by the first leg through the perforated plane and into the rain gutter.*

*9. The filter assembly of claim 8, wherein the first leg comprises a plurality of first legs disposed on the perforated plane wherein each of the first legs extends toward and contacts the first surface of the filter membrane.*

*10. The filter assembly according to claim 9, wherein each of the first legs includes a first end contacting the first surface of the filter membrane.*

*11. The filter assembly according to claim 8, further comprising:*

*a second leg disposed on the perforated plane and extending in a direction away from the filter membrane, opposite the first leg, the second leg comprising a free end, wherein the second leg extends along the length of the skeletal structure below the perforated plane.*

*12. The filter assembly according to claim 11, wherein the second leg comprises a plurality of second legs extending along the length of the skeletal structure below the perforated plane.*

*13. The filter assembly according to claim 8, wherein the skeletal structure further comprises first and second additional planes arranged along opposite sides of the perforated plane and defining the longitudinally extending ends, wherein the first and second planes are arranged above the perforated plane.*

*14. The filter assembly according to claim 13, wherein the first and second additional planes are connected to and arranged parallel to the perforated plane, and wherein longitudinally extending edges of the filter membrane are attached to the first and second additional planes.*

*15. A gutter shield for mounting in an open top of a rain gutter, the gutter shield comprising:*

*an elongated body, wherein the filter assembly according to claim 8 is received in the elongated body.*

*16. The gutter shield according to claim 15, wherein the elongated body is extruded.*

*17. The gutter shield according to claim 15, wherein the elongated body comprises:*

*a first portion adapted to contact a front lip of the rain gutter;*

*a second portion coupled to the first portion and including a plurality of perforations; and*

*a third portion coupled to the second portion, wherein the filter assembly is received between the first and third portions and positioned over the second portion.*

*18. The gutter shield according to claim 17, wherein the third portion includes a recessed scoring channel on an upper planar surface for facilitating a clean breaking during installation of the gutter shield.*

*19. The gutter shield according to claim 17, further comprising:*

*a cover configured to be attached over the third portion, whereby when adjacent gutter shields are mounted side-by-side in the open top of the rain gutter, the cover spans a joint between the gutter shields.*

*20. The gutter shield according to claim 19, wherein the cover comprises aluminum, zinc, or copper.*

*21. The gutter shield according to claim 20, wherein the cover comprises zinc, whereby the zinc cover includes fungicidal properties and discourages moss, mold, or mildew growth.*

*22. The gutter shield according to claim 20, wherein the cover provides color and material matching of the gutter shield to the rain gutter.*

*23. The gutter shield according to claim 19, wherein the cover comprises a slide-on or clip-on metal cover.*

*24. The gutter shield according to claim 17, further comprising:*

*a cover configured to be attached over the first portion, whereby when adjacent gutter shields are mounted side-by-side in the open top of the rain gutter, the cover may span a joint between the gutter shields.*

*25. The gutter shield according to claim 24, wherein the cover comprises aluminum, zinc, or copper.*

*26. The gutter shield according to claim 25, wherein the cover comprises zinc, whereby the zinc cover includes fungicidal properties and discourages moss, mold, or mildew growth.*

*27. The gutter shield according to claim 25, wherein the cover provides color and material matching of the gutter shield to the rain gutter.*

*28. The gutter shield according to claim 24, wherein the cover comprises a slide-on or clip-on metal cover.*

*29. The gutter shield according to claim 17, wherein the third portion includes a recessed receiving channel arranged adjacent to the second portion and configured to receive one of the longitudinally extending ends of the skeletal structure, and wherein the recessed receiving channel includes an upper extension extending over the longitudinally extending end of the skeletal structure and over a longitudinally extending edge of the filter membrane.*

* * * * *